US012641544B2

(12) United States Patent (10) Patent No.: US 12,641,544 B2
Abotabl et al. (45) Date of Patent: May 26, 2026

(54) SIDELINK POWER CONTROL UNDER NETWORK OPERATION STATES

(71) Applicant: QUALCOMM Incorporated, San Diego, CA (US)

(72) Inventors: Ahmed Attia Abotabl, San Diego, CA (US); Marwen Zorgui, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 18/340,465

(22) Filed: Jun. 23, 2023

(65) Prior Publication Data

US 2024/0430808 A1 Dec. 26, 2024

(51) Int. Cl.
*H04W 52/14* (2009.01)
*H04W 52/08* (2009.01)
*H04W 52/10* (2009.01)
*H04W 52/24* (2009.01)

(52) U.S. Cl.
CPC ........... *H04W 52/14* (2013.01); *H04W 52/08* (2013.01); *H04W 52/10* (2013.01); *H04W 52/242* (2013.01)

(58) Field of Classification Search
CPC ..... H04W 52/14; H04W 52/08; H04W 52/10; H04W 52/242; H04W 52/383
See application file for complete search history.

(56) References Cited

U.S. PATENT DOCUMENTS

| | | | | |
|---|---|---|---|---|
| 11,683,793 | B2 * | 6/2023 | Yang ................... | H04W 52/143 |
| | | | | 370/329 |
| 12,156,146 | B2 * | 11/2024 | Bai ..................... | H04W 52/248 |
| 2021/0037479 | A1 * | 2/2021 | Akkarakaran ........ | H04W 24/10 |
| 2021/0058866 | A1 | 2/2021 | Hosseini et al. | |
| 2021/0219283 | A1 * | 7/2021 | Xue ..................... | H04W 72/20 |
| 2022/0225280 | A1 * | 7/2022 | Yang ..................... | H04W 72/02 |

(Continued)

OTHER PUBLICATIONS

Mushtaq, et al., "Power Saving Model for Mobile Device and Virtual Base Station in the 5G Era", Conference Paper dated May 2017, IEEE ICC 2017 Ad Hoc and Sensor Networking Symposium. 7 pages.

(Continued)

*Primary Examiner* — Afshawn M Towfighi
(74) *Attorney, Agent, or Firm* — Holland & Hart LLP

(57) ABSTRACT

Methods, systems, and devices for wireless communications are described. A user equipment (UE) may receive, over an access link, first control signaling indicating a correspondence between network operation states of a network and sidelink power control modes of the UE for sidelink communications. The UE may switch from a first sidelink power control mode to a second sidelink power control mode based on a change in a network operation state by the first network entity from a first network operation state to a second network operation state, where the second sidelink power control mode may correspond to the second network operation state. The UE may communicate one or more sidelink messages with the second wireless device, a programmable logic controller, or both over a sidelink channel in accordance with the second sidelink power control mode.

30 Claims, 11 Drawing Sheets

(56) References Cited

U.S. PATENT DOCUMENTS

2022/0295411 A1    9/2022  Fodor et al.
2024/0389025 A1*  11/2024  Xu .................... H04W 52/0235

OTHER PUBLICATIONS

3rd Generation Partnership Project (3GPP), "Study on Network Energy Savings for New Radio", 20 pages.
INTEL Corporation, "Summary #1 for Email Discussion on Energy Savings Techniques of NW Energy Saving SI" 3GPP TSG RAN WG1 Meeting #109-e, e-Meeting, May 9-20, 2022, 24 pages.

* cited by examiner 237               237

| First Network Operation State 230 | → | Second Network Operation State 235 |
|---|---|---|

| First Sidelink Power Control Mode 240 | → | Second Sidelink Power Control Mode 245 |
|---|---|---|

Network Entity 105-a 250        220

UE 115-a

Correspondence 237

250      225      225

PLC 218

Second Wireless Device 215

First Control Signaling 220

Sidelink Messages 225

SSB 250

200

510

520

515

505

500

Figure 9:
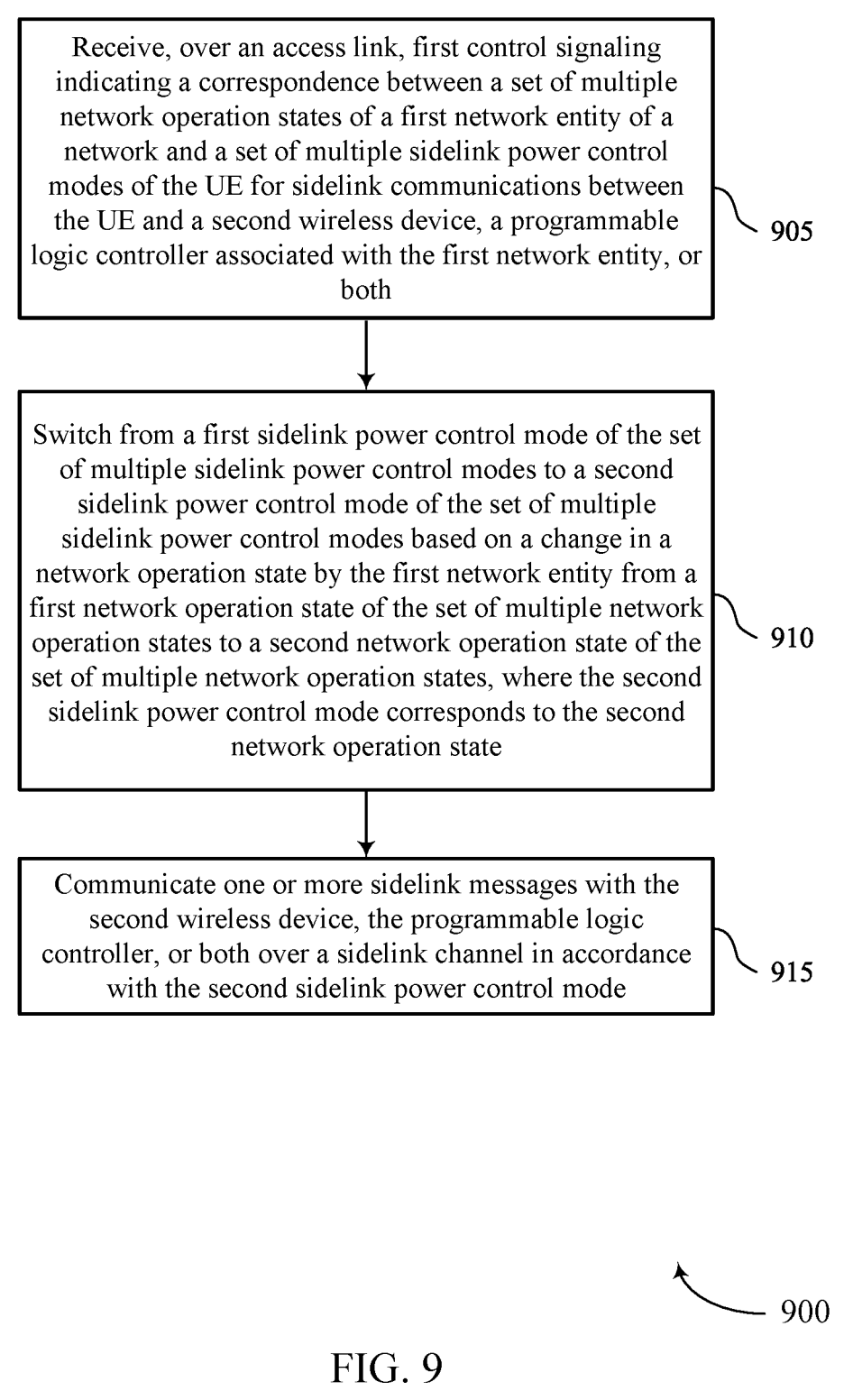

Receive, over an access link, first control signaling indicating a correspondence between a set of multiple network operation states of a first network entity of a network and a set of multiple sidelink power control modes of the UE for sidelink communications between the UE and a second wireless device, a programmable logic controller associated with the first network entity, or both

905

Switch from a first sidelink power control mode of the set of multiple sidelink power control modes to a second sidelink power control mode of the set of multiple sidelink power control modes based on a change in a network operation state by the first network entity from a first network operation state of the set of multiple network operation states to a second network operation state of the set of multiple network operation states, where the second sidelink power control mode corresponds to the second network operation state

910

Communicate one or more sidelink messages with the second wireless device, the programmable logic controller, or both over a sidelink channel in accordance with the second sidelink power control mode

Figure 10:
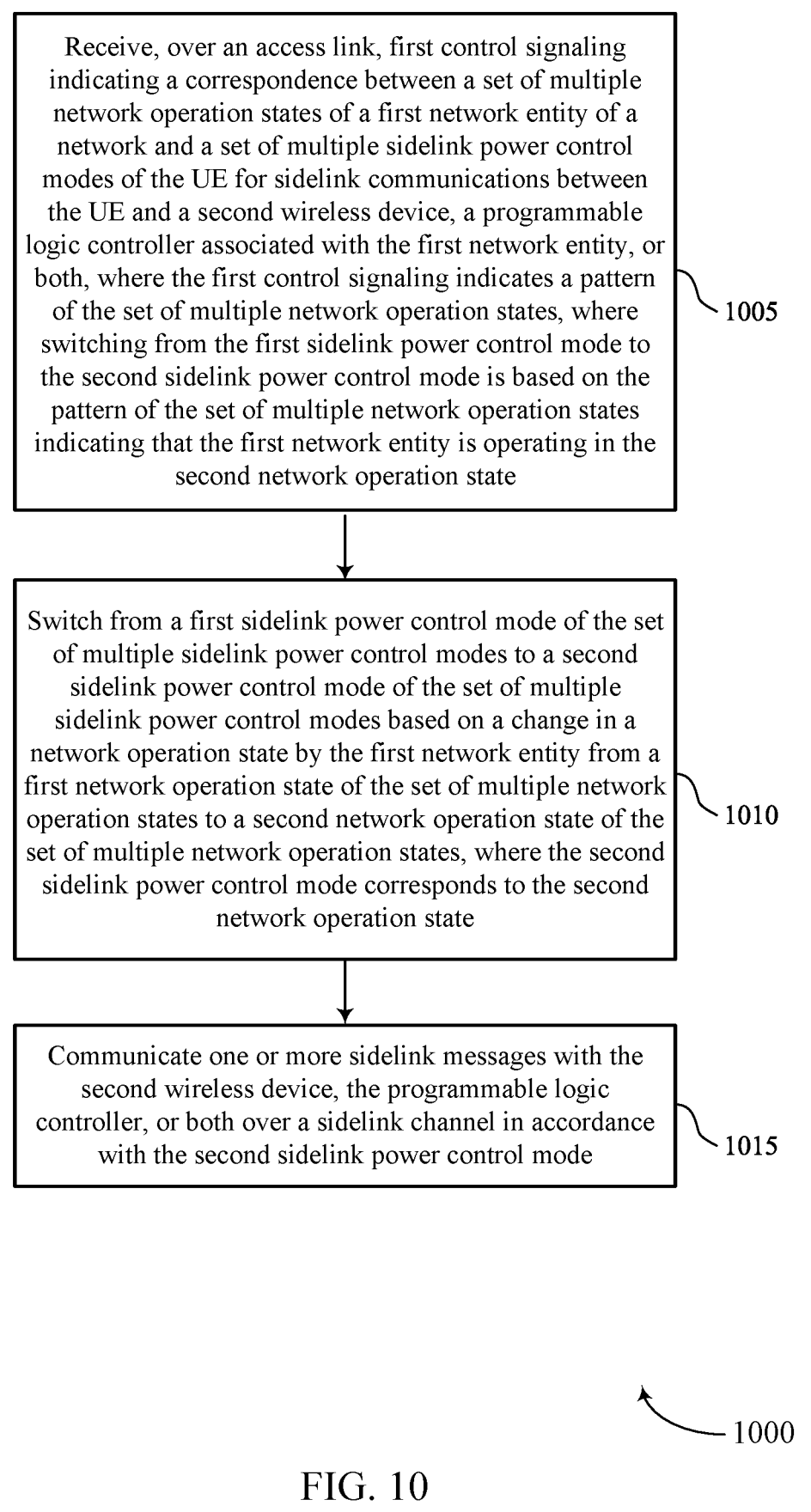

Receive, over an access link, first control signaling indicating a correspondence between a set of multiple network operation states of a first network entity of a network and a set of multiple sidelink power control modes of the UE for sidelink communications between the UE and a second wireless device, a programmable logic controller associated with the first network entity, or both, where the first control signaling indicates a pattern of the set of multiple network operation states, where switching from the first sidelink power control mode to the second sidelink power control mode is based on the pattern of the set of multiple network operation states indicating that the first network entity is operating in the second network operation state ⎫ 1005

Switch from a first sidelink power control mode of the set of multiple sidelink power control modes to a second sidelink power control mode of the set of multiple sidelink power control modes based on a change in a network operation state by the first network entity from a first network operation state of the set of multiple network operation states to a second network operation state of the set of multiple network operation states, where the second sidelink power control mode corresponds to the second network operation state ⎫ 1010

Communicate one or more sidelink messages with the second wireless device, the programmable logic controller, or both over a sidelink channel in accordance with the second sidelink power control mode ⎫ 1015

Figure 11:
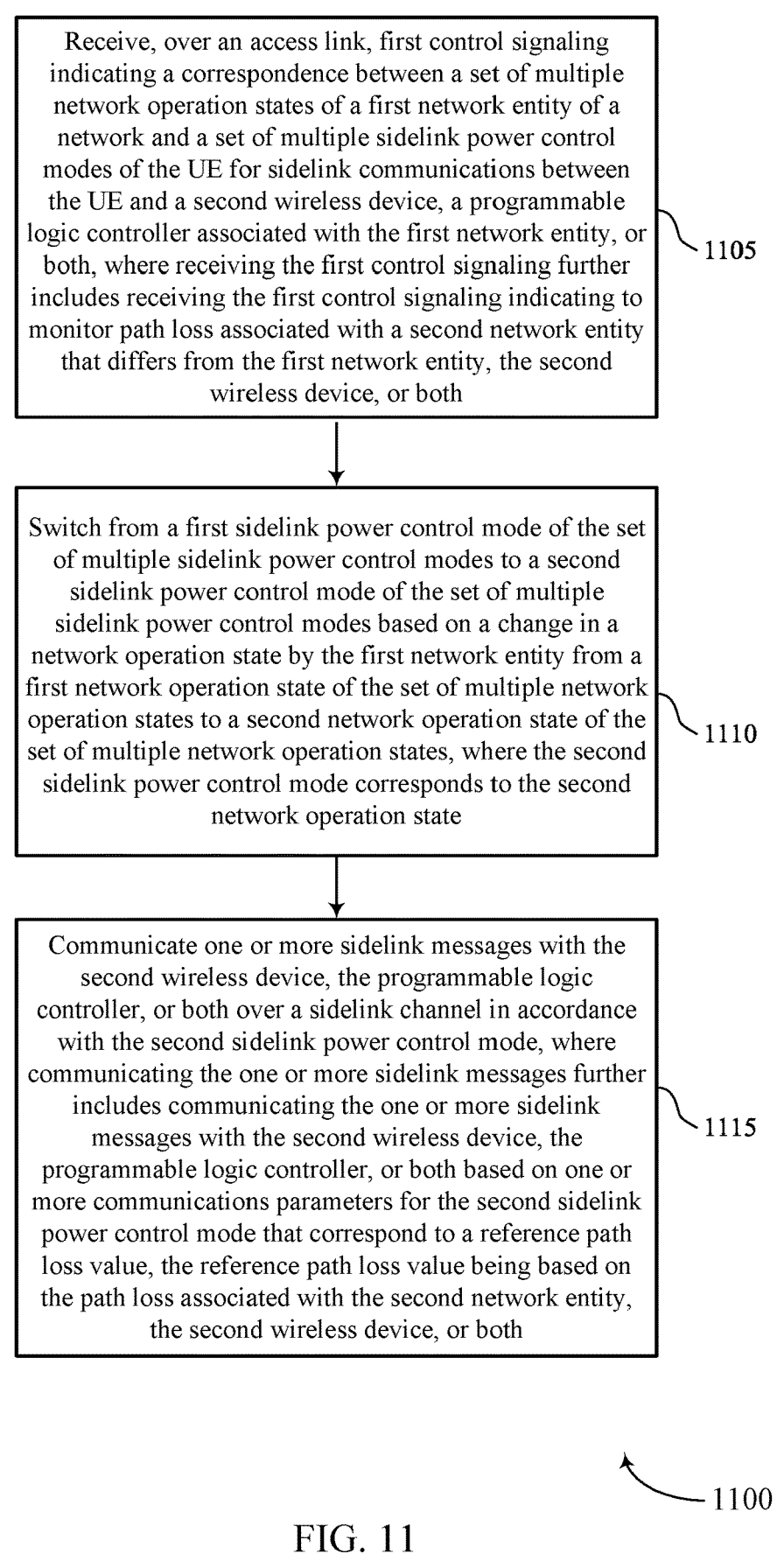

Receive, over an access link, first control signaling indicating a correspondence between a set of multiple network operation states of a first network entity of a network and a set of multiple sidelink power control modes of the UE for sidelink communications between the UE and a second wireless device, a programmable logic controller associated with the first network entity, or both, where receiving the first control signaling further includes receiving the first control signaling indicating to monitor path loss associated with a second network entity that differs from the first network entity, the second wireless device, or both

⟍ 1105

Switch from a first sidelink power control mode of the set of multiple sidelink power control modes to a second sidelink power control mode of the set of multiple sidelink power control modes based on a change in a network operation state by the first network entity from a first network operation state of the set of multiple network operation states to a second network operation state of the set of multiple network operation states, where the second sidelink power control mode corresponds to the second network operation state

⟍ 1110

Communicate one or more sidelink messages with the second wireless device, the programmable logic controller, or both over a sidelink channel in accordance with the second sidelink power control mode, where communicating the one or more sidelink messages further includes communicating the one or more sidelink messages with the second wireless device, the programmable logic controller, or both based on one or more communications parameters for the second sidelink power control mode that correspond to a reference path loss value, the reference path loss value being based on the path loss associated with the second network entity, the second wireless device, or both

SIDELINK POWER CONTROL UNDER NETWORK OPERATION STATES

FIELD OF TECHNOLOGY

The following relates to wireless communications, including sidelink power control under network operation states.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may perform power control operations. However, such approaches may be improved.

SUMMARY

The described techniques relate to improved methods, systems, devices, and apparatuses that support sidelink power control under network operation states. A user equipment (UE) may receive, over an access link, first control signaling indicating a correspondence between a plurality of network operation states of a first network entity of a network and a plurality of sidelink power control modes of the UE for sidelink communications between the UE and a second wireless device, a programmable logic controller associated with the first network entity, or both. The UE may switch from a first sidelink power control mode of the plurality of sidelink power control modes to a second sidelink power control mode of the plurality of sidelink power control modes based on a change in a network operation state by the first network entity from a first network operation state of the plurality of network operation states to a second network operation state of the plurality of network operation states, and the second sidelink power control mode may correspond to the second network operation state. The UE may communicate one or more sidelink messages with the second wireless device, the programmable logic controller, or both over a sidelink channel in accordance with the second sidelink power control mode.

A method for wireless communications at a user equipment (UE) is described. The method may include receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both, switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state, and communicating one or more sidelink messages with the second wireless device, the programmable logic controller, or both over a sidelink channel in accordance with the second sidelink power control mode.

An apparatus for wireless communications at a UE is described. The apparatus may include at least one processor, at least one memory coupled with the at least one processor, and instructions stored in the at least one memory. The instructions may be executable by the at least one processor to cause the apparatus to receive, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both, switch from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state, and communicate one or more sidelink messages with the second wireless device, the programmable logic controller, or both over a sidelink channel in accordance with the second sidelink power control mode.

Another apparatus for wireless communications at a UE is described. The apparatus may include means for receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both, means for switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state, and means for communicating one or more sidelink messages with the second wireless device, the programmable logic controller, or both over a sidelink channel in accordance with the second sidelink power control mode.

A non-transitory computer-readable medium storing code for wireless communications at a UE is described. The code may include instructions executable by at least one processor to receive, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both, switch from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state, and communicate one or more sidelink messages with the second wireless device, the programmable logic controller, or both over a sidelink channel in accordance with the second sidelink power control mode.

Some examples of the method, apparatuses, and non-transitory computer-readable medium described herein may further include operations, features, means, or instructions for receiving the first control signaling further indicating a pattern of the plurality of multiple network operation states, where switching from the first sidelink power control mode to the second sidelink power control mode may be based on the pattern of the plurality of multiple network operation states indicating that the first network entity may be operating in the second network operation state.

Some examples of the method, apparatuses, and non-transitory computer-readable medium described herein may further include operations, features, means, or instructions for receiving the first control signaling further includes receiving the first control signaling indicating to monitor path loss associated with a second network entity that differs from the first network entity, the second wireless device, the programmable logic controller, or any combination thereof and communicating the one or more sidelink messages further includes communicating the one or more sidelink messages with the second wireless device based on one or more communications parameters for the second sidelink power control mode that correspond to a reference path loss value, the reference path loss value being based on the path loss associated with the second network entity, the second wireless device, the programmable logic controller, or any combination thereof.

Some examples of the method, apparatuses, and non-transitory computer-readable medium described herein may further include operations, features, means, or instructions for receiving a control message that indicates to monitor path loss over an access link between the first network entity and the UE for use as a reference path loss in sidelink power control and where communicating the one or more sidelink messages further includes communicating the one or more sidelink messages with the second wireless device based on one or more communications parameters for the second sidelink power control mode that correspond to a value of the reference path loss.

Some examples of the method, apparatuses, and non-transitory computer-readable medium described herein may further include operations, features, means, or instructions for determining the change in the network operation state by the first network entity from the first network operation state to the second network operation state based on receiving a signal from the first network entity that indicates the change in the network operation state or a first time interval of a pattern of the plurality of network operation states ending and a second time interval of the pattern beginning.

Some examples of the method, apparatuses, and non-transitory computer-readable medium described herein may further include operations, features, means, or instructions for communicating one or more second sidelink messages with a programmable logic controller associated with the first network entity in one of the plurality of multiple sidelink power control modes that may be based on an active network operation state of the programmable logic controller and which of the first network operation state of the first network entity or the second network operation state of the first network entity is active.

Some examples of the method, apparatuses, and non-transitory computer-readable medium described herein may further include operations, features, means, or instructions for receiving a set of multiple synchronization signal blocks in accordance with a periodicity that may be based on an active network operation state of a programmable logic controller (e.g., a programmable logic controller associated with a network entity, such as the first network entity), the first network operation state of the first network entity, the second network operation state of the first network entity, or any combination thereof.

Some examples of the method, apparatuses, and non-transitory computer-readable medium described herein may further include operations, features, means, or instructions for receiving one or more synchronization signal blocks including a broadcast channel that indicates an active network operation state of a programmable logic controller associated with the first network entity, the first network operation state of the first network entity, the second network operation state of the first network entity, or any combination thereof.

In some examples of the method, apparatuses, and non-transitory computer-readable medium described herein, the second sidelink power control mode may be associated with one or more second values of open-loop power control parameters, closed-loop power control parameters, or both, that may be different that one or more first values of open-loop power control parameters, closed-loop power control parameters, or both that may be associated with the first sidelink power control mode.

Some examples of the method, apparatuses, and non-transitory computer-readable medium described herein may further include operations, features, means, or instructions for receiving control signaling indicating one or more closed-loop power control parameters, one or more open-loop power control parameters, or both, that may be associated with one or more of the plurality of sidelink power control modes and operating in the first sidelink power control mode or in the second sidelink power control mode using the one or more closed-loop power control parameters, the one or more open-loop power control parameters, or both.

In some examples of the method, apparatuses, and non-transitory computer-readable medium described herein, the plurality of multiple network operation states may be associated with an antenna configuration, a transmit power configuration, withholding transmission of a synchronization signal block, withholding transmission of a system information block, or any combination thereof.

In some examples of the method, apparatuses, and non-transitory computer-readable medium described herein, the first control signaling may be radio resource control signaling.

BRIEF DESCRIPTION OF THE DRAWINGS

FIGS. 9 through 11 show flowcharts illustrating methods for sidelink power control under network operation states in accordance with one or more examples as disclosed herein.

DETAILED DESCRIPTION

Figure 1:
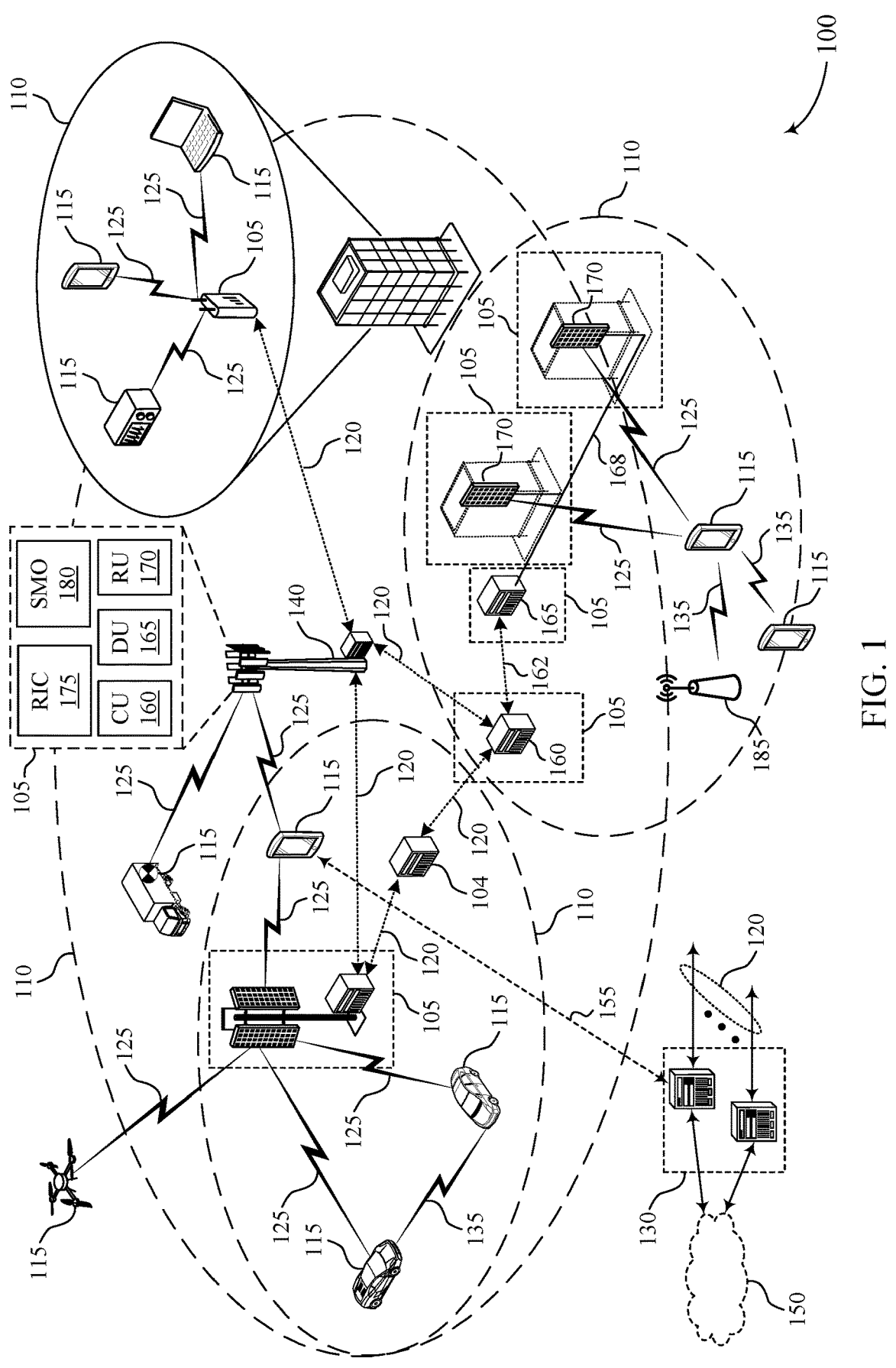
FIG. 1 shows an example of a wireless communications system that supports sidelink power control under network operation states in accordance with one or more examples as disclosed herein.

In wireless communications a network entity of a network may operate in multiple network operation states (e.g., in different network energy saving (NES) states). Such states may involve operations that may performed to reduce energy consumption at the network entity or elsewhere in the network (e.g., at a user equipment (UE)), such as reducing the quantity of antennas used for communications, reducing a transmission power level for transmissions, refraining from transmitting synchronization signal blocks (SSBs), refraining from transmitting system information blocks (SIBs) (such as SIB-1), one or more other operations aimed at reducing power consumption by the network entity, or any combination thereof. However, some approaches do not account for how such network operation states may impact sidelink communications, such as sidelink power control operations. For example, in some approaches, a UE may engage in sidelink communications and engage in sidelink power control operations without considering the network operation states of other devices in the network.

A UE that is operating in sidelink may adaptively adjust or select sidelink power control operations based on one or more network operation states of the network entity of the network. For example, the UE may receive indications that some network operation states may be associated with some sidelink power control modes. In response to or based on detecting a change to such an network operation state (e.g., a change in an active NES state), the UE may operate with an associated sidelink power control mode for sidelink communications. Further, one or more power control communication parameters (e.g., power control parameters for open-loop power control, closed-loop power control, or both) may be adjusted based on the network operation state, (e.g., an active NES state).

Thus, a UE communicating in sidelink may offer increased communications quality and reliability while reducing interference with other communications even while the network operates in different operation states (e.g., NES states). For example, the UE may communicate using increased transmission power in sidelink communications in response to a network entity reducing its own transmit power, increasing sidelink communications coverage, quality, and reliability. Similarly, a UE may avoid using too much transmission power in cases where a network entity is transmitting with full transmit power, avoiding interference with network entity communications and reducing power consumption at the UE.

In some examples, the UE may receive an indication of a pattern of network operation states (e.g., a pattern of NES states) that the network entity or other device will follow in the course of operation. The UE may switch between corresponding sidelink power control modes in accordance with the pattern of network operation states. In this way, communications overhead may be reduced, as the entire pattern may be transmitted at once (e.g., instead of a piecemeal approach in which each network operation state is transmitted individually at different times).

In some examples, changing between different network operation states may result in the UE changing which device is monitored as a reference for a path loss measurement for sidelink power control (e.g., network entities, devices with which the UE communicates via sidelink, one or more other devices that may be affected by communications of the UE, one or more other devices, or any combination thereof). A network entity transitioning to a lower power network operation state may result in the UE monitoring a different device as a reference for a path loss measurement for sidelink power control. Thus, the UE may effectively perform sidelink power control when the network entity transitions to a low power operation state.

Aspects of the disclosure are initially described in the context of wireless communications systems. Aspects of the disclosure are then described with reference to a wireless communications system, a power control scheme, and a process flow. Aspects of the disclosure are further illustrated by and described with reference to apparatus diagrams, system diagrams, and flowcharts that relate to sidelink power control under network operation states.

FIG. 1 shows an example of a wireless communications system 100 that supports sidelink power control under network operation states in accordance with one or more examples as disclosed herein. The wireless communications system 100 may include one or more network entities 105 (e.g., a base station, an eNB, or a gNB), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network

130 via a communication link 155 (e.g., established via an access link to the network entity 105).

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support sidelink power control under network operation states as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)).

Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may include one or more programmable logic controllers (PLCs), such as the PLC 185. The PLC 185 may be a data processing device that may manage one or more aspects of operations of the wireless communications system 100. In some examples, the PLC 185 may be different than a UE 115, a network entity 105, a wireless device, or any combination thereof. For example, in some cases, a PLC (e.g., the PLC 185) may be co-located with or associated with a network entity 105 and may manage one or more operations associated with communications of the network entity 105. In some examples, the PLC 185 may be a stationary device that may perform one or more functions of a network entity 105 or functions associated with a network entity 105.

In some examples, the network entity 105 may communicate to the UE 115 control signaling indicating that a quantity of network operation states correspond to a quantity of sidelink power control modes. Then, in the course of operations, the network entity 105 may change between network operation states (e.g., a reduced power state or a full-power state) over time. The UE 115 may, as a result, switch operation to a sidelink power control mode that corresponds to the active network operation state of the network entity 105, and may communicate via sidelink communications in the sidelink power control mode (e.g., with another UE 115, the PLC 185, or with another device). For example, if the network entity 105 communicates using a reduced power state, the UE 115 may communicate using a greater transmit power for the sidelink communications without interfering with the communications of the network entity 105 in the reduced power mode.

Figure 2:
FIG. 2 shows an example of a wireless communications system that supports sidelink power control under network operation states in accordance with one or more examples as disclosed herein.
Figure 2:
Figure 2:
Figure 2:
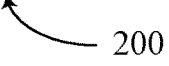

FIG. 2 shows an example of a wireless communications system 200 that supports sidelink power control under network operation states in accordance with one or more examples as disclosed herein. In wireless communications, network energy consumption may be a significant cost in the operation of a wireless communications network. For example, power consumption at a network entity (e.g., network entity 105-a) operating in a multiple input multiple output (MIMO) scenario may consume large amounts of power. As such, network energy savings features are desired for further adoption and expansion of wireless communications network.

In some examples, the wireless communications system 200 may include the PLC 218. The PLC 218 may be a data processing device that may manage one or more aspects of operations of the wireless communications system 200. In some examples, the PLC 218 may be different than the UE 115-a, a network entity 105-a, a wireless device, or any combination thereof. For example, in some cases, a PLC (e.g., the PLC 218) may be co-located with or associated with the network entity 105-a and may manage one or more operations associated with communications of the network entity 105-a. In some examples, the PLC 218 may be a stationary device that may perform one or more functions of a network entity 105-a or functions associated with a network entity 105-a.

In some cases, the network entity 105-a may employ different network operation states (e.g., NES states) that may consume different levels of power based on the network communication traffic conditions. Such network operation states may refer to, include, or be associated with any operation that may be used for conserving energy at a wireless device, such as a reduction in a quantity of antennas used, communications power reduction, operation without the use of SSBs, SIBs, or both, any other power saving operation, or any combination thereof. For example, if the network entity 105-a reduces a quantity of transmit antenna ports that it will use, another network entity may increase its coverage to compensate for this coverage change. Both of these changes may influence one or more operations, such as the selection between mode 1 and mode 2 sidelink resource allocation or sidelink power control operations of the UE 115-a. In mode 1, the network entity 105-a allocates resources for sidelink communications between UEs. In mode 1, dynamic grants (DG), configured grants (CG) type 1, and configured grants type 2 are supported. In an example, network entity 105-a may provide DCI (e.g., format 3-0) over PDCCH. The DCI may be a dynamic grant and provides allocation to use over sidelink. The DCI may activate a configured grant type 2 for sidelink. For dynamic grants, DCI 3-0 may indication whether the allocation is for a retransmission. In another example, configured grant type 1 is activated via RRC signaling from the network entity 105-a. The UE 115-a in mode 1 may report a sidelink buffer status report (BSR) to the network entity 105-a using a control message, such as a MAC-CE. In some examples, modulation and coding scheme (MCS) selection may be up to the UE 115-a, within limits or guidance provided by the network entity 105-a. In mode 2, UEs autonomously select sidelink resources. In example, to reduce interference, maintain sidelink coverage, or both, the UE 115-a may adjust its sidelink power control operations to adapt to the specific network conditions (e.g., determining a transmit power to be used based on the network condition).

In some examples, the UE 115-a may operate in different power control modes, such as the first sidelink power control mode 240 or the second sidelink power control mode 245.

For example, the UE 115-*a* may operate in a sidelink power control mode that may involve full or maximum power transmissions. Such a sidelink power control mode may be used in situations in which the UE 115-*a* is out of coverage in attempts to increase sidelink communications coverage.

In some examples, the UE 115-*a* may operate in a power control mode that may involve open loop power control (e.g., the first sidelink power control mode 240, the second sidelink power control mode 245, one or more other sidelink power control modes, or both). In open-loop power control, a transmit power or other power parameter may be based on a pathloss, an offset for reference target power (Po), an MCS offset relative to a reference or any combination thereof. In some examples, sidelink power control may be based on sidelink communications (e.g., communications between the UE 115-*a* and the second wireless device 215 or the PLC 218), access link communications (e.g., communications between the UE 115-*a* and the network entity 105-*a*), one or more other communications, or any combination thereof. For example, the UE 115-*a* may operate in the second sidelink power control mode 245 involving an acceptable pathloss across the access link, a reduced pathloss across the sidelink, or may involve adjustments to access link pathloss computations or operations before computing the acceptable pathloss. Further, in some examples such as static cases (e.g., in which the network entity 105-*a* may communicate using PC5 communications), a reduced or slower adaption of the offset for a reference target power may be employed (e.g., dynamic transmit power control (TPC) may not be used).

In some examples, the UE 115-*a* may operate in a power control mode that may involve closed-loop power control (e.g., the first sidelink power control mode 240, the second sidelink power control mode 245, one or more other sidelink power control modes, or both). For example, in addition to open-loop operations, the UE 115-*a* may receive TPC commands from the network entity 105-*a*, another device with which the UE is communicating in sidelink, one or more other devices, or any combination thereof, which may offer increased dynamic power control. In some examples, a sidelink device may relay such a command through the network entity 105-*a* or other network entity (e.g., in a case in which the transmitting and receiving devices that are communicating over sidelink may not be in the same cell). In some examples, the network entity 105-*a* may generate one or more TPC commands to manage transmit powers of sidelink communications (e.g., based on interference considerations occurring between the access link and the sidelink).

However, in other approaches, power saving operations of network entities may not affect sidelink power control. In other words, the sidelink power control may be performed independently of the power saving operations of a network, resulting in increased interference and reduced communications quality.

As such, to reduce or eliminate such problems, sidelink power control may be performed adaptively based on a currently utilized network operation state (e.g., a NES state used by network entity 105-*a*). For example, the first network operation state 230 and the second network operation state 235 of the network may involve one or more power saving operations of the network entity 105-*a*. The UE 115-*a* may operate in the first sidelink power control mode 240 in response to the network entity 105-*a* operating in the first network operation state 230 based on a correspondence 237 established between the first network operation state 230 and the first sidelink power control mode 240. Similarly, the UE 115-*a* may operate in the second sidelink power control mode 245 in response to the network entity 105-*a* operating in the second network operation state 235 based on the correspondence 237 established between the second network operation state 235 and the second sidelink power control mode 245. In some examples, such a correspondence 237 between network operation states and sidelink power control modes may be indicated to the UE 115-*a* in the first control signaling 220, which may be RRC signaling or other control signaling.

For example, in response to a switch in network operation state at the network entity 105-*a*, the UE 115-*a* may implicitly or explicitly determine or select to perform a switch between sidelink power control modes. For example, if the network entity 105-*a* enters an inactive or sleep state (e.g., associated with the second network operation state 235), the UE 115-*a* may switch to a sidelink power control mode whereby the UE 115-*a* may transmit the sidelink messages 225 to the second wireless device 215 or the PLC 218 with an increased or maximum transmission power (e.g., since there may not be any access link communications (e.g., Uu link communications), increased sidelink coverage may be possible without interference). In some example, the UE 115-*a* may implicitly determine a change in network operation state based on a change in operations of the 105-*a*. Additionally, or alternatively, the UE 115-*a* may determine a change in network operation state based on explicit signaling (e.g., from the network entity 105-*a*) that indicates the change in network operation state.

In some examples, open-loop power control, closed-loop power control, or both, may be adapted or modified based on the network operation states. For example, the UE 115-*a* may not receive TPC commands for closed-loop power control from the network so the UE 115-*a* may switch to another power control mode that does not use TPC commands.

For example, in connection with open-loop power control, the UE 115-*a* may use a path loss from the transmitting UE 115-*a* to the network entity 105-*a*, a path loss from the UE 115-*a* to the second wireless device 215, a path loss between other devices, or any combination thereof as a basis for modifying open-loop power control (e.g., which may be used in connection with the first sidelink power control mode 240, the second sidelink power control mode 245, one or more other sidelink power control modes, or any combination thereof). In some examples, the UE 115-*a* may be configured (e.g., by the network entity 105-*a* or other device) to use one or more path losses for the open-loop power control.

In some examples, if the UE 115-*a* is configured to use a path loss from the UE 115-*a* to network entity 105-*a* in sidelink power control, in some network operation states, the UE 115-*a* may (e.g., as an alternative or in case of failure) fall back to using path loss observed between the UE 115-*a* and second wireless device 215 only, or may fall back to using path loss observed between the UE 115-*a* associated with another reference device (e.g., the PLC 218 or others), for sidelink power control. As such, the UE 115-*a* may utilize different reference device for observing a reference path loss for open-loop power control for determining a transmission power level for sidelink communication based on the observed path loss. Further, the UE 115-*a* may use different reference path losses for sidelink power control when the network entity 105-*a* is in different network operation states.

In some examples, PLCs, such as the PLC 218, or other devices in sidelink communications may be included as part of a network (e.g., for purposes of network-side power saving operations) and may also operate in multiple different network operation states. Such network operation states can be different than those in which the network entity 105-*a* operates or may be the same as those in which the network entity 105-*a* operates.

In some examples, the first network operation state 230, the second network operation state 235, or both, may be network operation states associated with the PLC 218, and the UE 115-*a* may operate in the first sidelink power control mode 240 in response to the PLC 218 operating in the first network operation state 230 and may further operate in the second sidelink power control mode 245 in response to the PLC 218 operating in the second network operation state 235. In such cases, the first network operation state 230, the second network operation state 235, or both, may not be associated with the network entity 105-*a* (e.g., the network entity 105-*a* may not operate in the first network operation state 230, the network entity 105-*a* may not operate in the second network operation state 235, or the network entity 105-*a* may not operate in either of the first network operation state 230 or the second network operation state 235). In some examples, power control used by a UE to communicate with PLC 218 may be a function of an active network operation state in which the PLC 218 is currently operating.

In some examples, both the network entity 105-*a* and the PLC 218 may operate in their own network operation states (e.g., that may be the same network operation states or may be different network operation states, either individually or collectively) and the UE 115-*a* may operate in sidelink power control modes as a function of both the network operation states of the network entity 105-*a* and the network operation states of the PLC 218 (e.g., a joint NES state of network entity and PLC).

In some examples, the PLC 218, the network entity 105-*a*, or both, may transmit one or more SSBs, such as SSB 250, to the UE 115-*a*. Such SSB transmissions may have a periodicity that may be a function of an active network operation state of the PLC 218, a current network operation state of the network entity 105-*a*, or both. Contents of the SSB 250 may be different based on different network operation states. For example, the SSB 250 may include one or more indications of network operation states of the PLC 218, the network entity 105-*a*, one or more other wireless devices, or any combination thereof. Such information may be useful for the UE 115-*a* to determine a current or future network operation state that is to be used and further determine that the UE 115-*a* is to use a corresponding sidelink power control mode. Additionally, an indication of an active network operation state of PLC 218, of network entity 105-*a*, or both, may be included in physical sidelink broadcast channel (PSBCH) of SSB 250, which the UE 115-*a* may use to change a sidelink power control mode based at least on the network operation state of one or more both of the PLC 218, of network entity 105-*a*.

In some examples, closed-loop power control parameters, open-loop power control parameters, or both, can be configured using control signaling (e.g., L1 signaling, L2 signaling, L3 signaling, or any combination thereof) by the network entity 105-*a* or another wireless device. Additionally, or alternatively, closed-loop power control parameters, open-loop power control parameters, or both signals and can also be transmitted as part of the PSBCH associated with the SSB 250.

Figure 3:
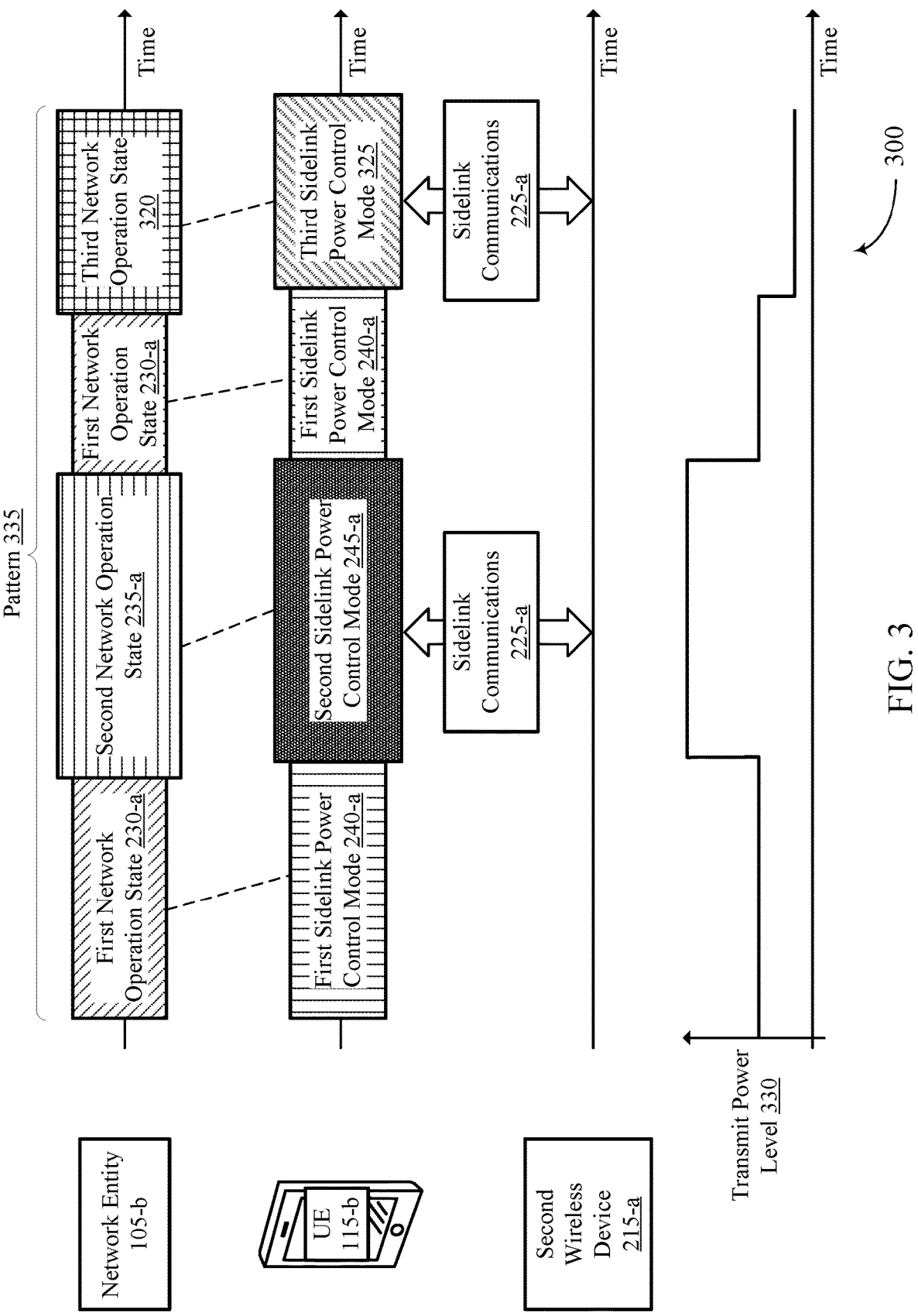
FIG. 3 shows an example of a power control scheme that supports sidelink power control under network operation states in accordance with one or more examples as disclosed herein.

FIG. 3 shows an example of a power control scheme 300 that supports sidelink power control under network operation states in accordance with one or more examples as disclosed herein. The power control scheme 300 may involve, as an example, the network entity 105-*b*, the UE 115-*b*, and the second wireless device 215-*a*. Though the particular examples discussed herein involve the network entity 105-*b*, the PLC 218 or one or more other wireless devices may, as an alternative to or in addition to the network entity 105-*b*, may perform the same or similar operations as those described in relation to the network entity 105-*b* of FIG. 3.

As described elsewhere herein, the network entity 105-*b* may operate in one or more network operation states (e.g., the first network operation state 230-*a*, the second network operation state 235-*a*, and the third network operation state 320) in which the network entity 105-*b* may perform energy saving operations. In response, the UE 115-*b* may operate using one or more sidelink power control modes, such as the first sidelink power control mode 240-*a*, the second sidelink power control mode 245-*a*, and the third sidelink power control mode 325.

In the course of operation, the network entity 105-*b* may determine a pattern 335 of network operation states in which the network entity 105-*b* may operate. In some examples, such a pattern 335 may be communicated to the UE 115-*b* (e.g., through control signaling, SSB signaling, or in another manner) and it may further be indicated that the pattern of network operation states corresponds to a pattern of sidelink power control modes in which the UE 115-*b* is to operate. The UE 115-*b* may then, in response to the network entity 105-*b* changing from one network operation state to another in the pattern 335 of network operation states, change from one sidelink power control mode to another in a similar pattern. For example, as shown in FIG. 3, the first network operation state 230-*a*, the second network operation state 235-1, and the third network operation state 320 may correspond to the first sidelink power control mode 240-*a*, the second sidelink power control mode 245-*a*, and the third sidelink power control mode 325, respectively, and the UE 115-*b* may operate in the first sidelink power control mode 240-*a*, the second sidelink power control mode 245-*a*, or the third sidelink power control mode 325 based on a network operation state corresponding with a sidelink power control mode.

For example, the transmit power level 330 is one example of a power control parameter that may be adjusted for different sidelink power control modes. For example, the first network operation state 230-*a* may be a wake state in which the network entity 105-*b* transmits at a defined power level. As such, in the first sidelink power control mode 240-*a*, the UE 115-*b* may operate at a corresponding power level to avoid interference with the communications of the network entity 105-*b*. However, the second network operation state 235-*a* may be a sleep or reduced operation state in which the network entity 105-*b* may perform few or no communications. As a result, the UE 115-*b* may operate at a higher power level in accordance with the second sidelink power control mode 245-*a*, as the potential interference may be reduced due to the network entity 105-*b* performing few or no communications. The network entity 105-*b* may again enter the first network operation state 230-*a*, and the UE 115-*b* may again enter the first sidelink power control mode 240-*a* and transmit with the same transmit power level 330 that it previously used in connection with the first sidelink power control mode. Further, the network entity 105-*b* may enter the third network operation state 320 in which the network entity 105-*b* may increase its own transmit power. As a result, the UE 115-*b* may operate in the third sidelink power control mode 325 using a reduced transmit power level 330 to reduce or avoid interference with the greater coverage area associated with the third network operation state 320 of the network entity 105-*b*.

In some examples, power control parameters may refer to, include, or be associated with any operation that may be used for conserving energy at a wireless devices, such as a reduction in a quantity of antennas used, communications power reduction, operation without the use of SSBs, SIBs, or both, any other power saving operation, or any combination thereof. For example, if the network entity 105-*a* reduces a quantity of transmit antenna ports that it will use, another network entity may increase its coverage to compensate for this coverage change.

Figure 4:
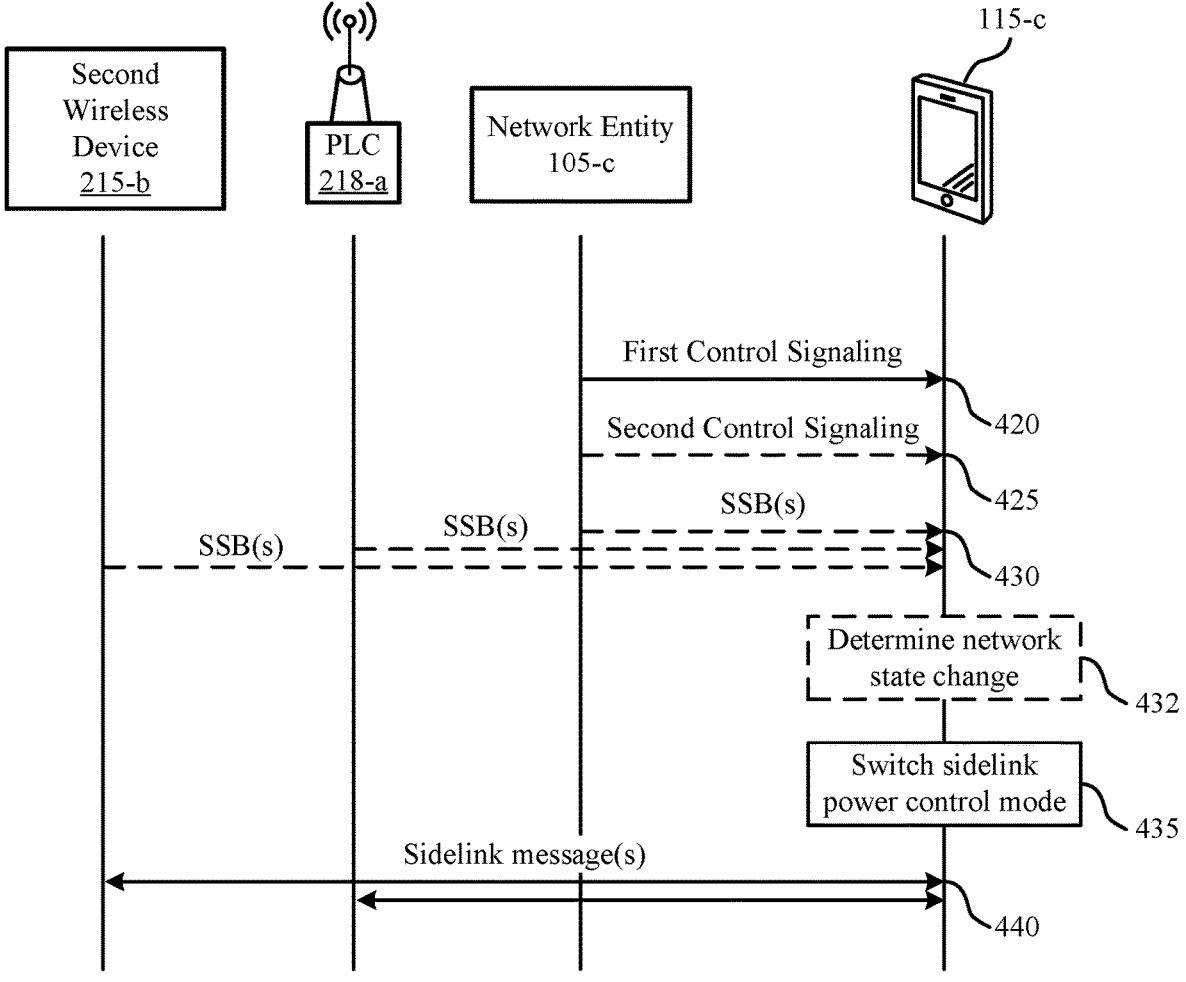
FIG. 4 shows an example of a process flow that supports sidelink power control under network operation states in accordance with one or more examples as disclosed herein.

FIG. 4 shows an example of a process flow 400 that supports sidelink power control under network operation states in accordance with one or more examples as disclosed herein. The process flow 400 may implement various aspects of the present disclosure described herein. The elements described in the process flow 400 (e.g., the UE 115-*c*, the network entity 105-*c*, the PLC 218-*a*, and the second wireless device 215-*b* 215-*b*) may be examples of similarly-named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the UE 115-*c* may receive, over an access link, first control signaling indicating a correspondence between a plurality of network operation states of a network entity 105-*c* of a network and a plurality of sidelink power control modes of the UE for sidelink communications between the UE and a second wireless device 215-*b*, a PLC 218-*a* associated with the first network entity in one of the plurality of sidelink power control modes that corresponds to an active network operation state of the plurality of network operation states for the first network entity, or both. In some examples, the UE 115-*c* may receive the first control signaling indicating a pattern of the plurality of network operation states and switching from the first sidelink power control mode to the second sidelink power control mode is based on the pattern of the plurality of network operation states indicating that the network entity 105-*c* is operating in the second network operation state. In some examples, receiving the first control signaling further may include receiving the first control signaling indicating to monitor path loss associated with a second network entity that differs from the network entity 105-*c*, the second wireless device 215-*b*, or both. In some examples, the plurality of network operation states are associated with an antenna configuration, a transmit power configuration, withholding transmission of a synchronization signal block, withholding transmission of a system information block, or any combination thereof. In some examples, the first control signaling is radio resource control signaling.

At 425, the UE 115-*c* may receive second control signaling that may indicate to monitor path loss over an access link between the network entity 105-*c* and the UE for use as a reference path loss in sidelink power control. Additionally, or alternatively, the second control signaling may indicate one or more closed-loop power control parameters, one or more open-loop power control parameters, or both that are associated with one or more of the plurality of sidelink power control modes. In some examples, the UE 115-*c* may operate in the first sidelink power control mode or in the second sidelink power control mode using the one or more closed-loop power control parameters, the one or more open-loop power control parameters, or both. The second control signaling may be included in or transmitted with the first control signaling or may be separate control signaling.

At 430, the UE 115-*c* may receive a plurality of synchronization signal blocks (SSBs) in accordance with a periodicity that is based on an active network operation state of a PLC 218-*a*, an active network operation state of the network entity 105-*c*, or both. Additionally, or alternatively, the UE 115-*c* may receive one or more (SSBs) that may include a broadcast channel that indicates an active network operation state of a PLC 218-*a* associated with the network entity 105-*c*, an active network operation state of the network entity 105-*c*, or both.

At 432, the UE 115-*c* may determine a change in a network operation state by the first network entity from a first network operation state of the plurality of network operation states to a second network operation state of the plurality of network operation states. In some examples, the UE 115-*c* may detect the change based on the pattern being associated with time intervals and each time interval corresponding to a respective network operation state, and the UE 115-*c* determines the change from a first network operation state to a second network operation based on a current time interval ending and a new time interval beginning. In some examples, the UE 115-*c* may detect the change based on receiving a signal from the first network entity 105-*c* that indicates the change.

At 435, the UE 115-*c* may switch from a first sidelink power control mode of the plurality of sidelink power control modes to a second sidelink power control mode of the plurality of sidelink power control modes based on a change in a network operation state by the network entity 105-*c* from a first network operation state of the plurality of network operation states to a second network operation state of the plurality of network operation states and the second sidelink power control mode corresponds to the second network operation state. In some examples, the second sidelink power control mode may be associated with one or more second values of open-loop power control parameters, closed-loop power control parameters, or both, that are different that one or more first values of open-loop power control parameters, closed-loop power control parameters, or both that are associated with the first sidelink power control mode.

At 440, the UE 115-*c* may communicate one or more sidelink messages with the second wireless device 215-*b*, the programmable logic controller 218-*a*, or both over a sidelink channel in accordance with the second sidelink power control mode. In some examples, communicating the one or more sidelink messages further may include communicating the one or more sidelink messages with the second wireless device 215-*b* based on one or more communication parameters (e.g., power control parameters for open-loop power control, closed-loop power control, or both) for the second sidelink power control mode that correspond to a reference path loss value, the reference path loss value being based on the path loss associated with the second network entity, the second wireless device, the programmable logic controller, or any combination thereof. In some examples, communicating the one or more sidelink messages further may include communicating the one or more sidelink messages with the second wireless device 215-b based on one or more communication parameters for the second sidelink power control mode that correspond to a value of the reference path loss.

In some examples, the UE 115-c may communicate one or more second sidelink messages with a PLC 218-a associated with the network entity 105-c in one of the plurality of sidelink power control modes that is based on an active network operation state of the PLC 218-a and an active network operation state of the network entity 105-c.

Figure 5:
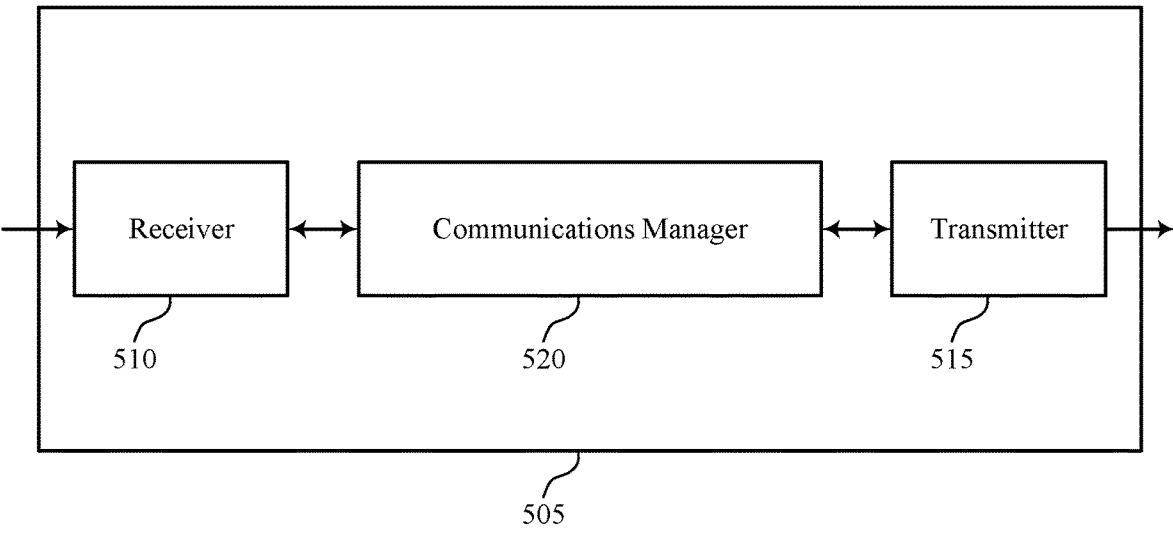
FIGS. 5 and 6 show block diagrams of devices that support sidelink power control under network operation states in accordance with one or more examples as disclosed herein.

FIG. 5 shows a block diagram 500 of a device 505 that supports sidelink power control under network operation states in accordance with one or more examples as disclosed herein. The device 505 may be an example of aspects of a UE 115 as described herein. The device 505 may include a receiver 510, a transmitter 515, and a communications manager 520. The device 505 may also include at least one processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink power control under network operation states). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink power control under network operation states). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of sidelink power control under network operation states as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include at least one processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communications at a UE in accordance with examples as disclosed herein. For example, the communications manager 520 is capable of, configured to, or operable to support a means for receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both. The communications manager 520 is capable of, configured to, or operable to support a means for switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state. The communications manager 520 is capable of, configured to, or operable to support a means for communicating one or more sidelink messages with the second wireless device, the programmable logic controller, or both over a sidelink channel in accordance with the second sidelink power control mode.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, more efficient utilization of communication resources, or any combination thereof.

Figure 6:
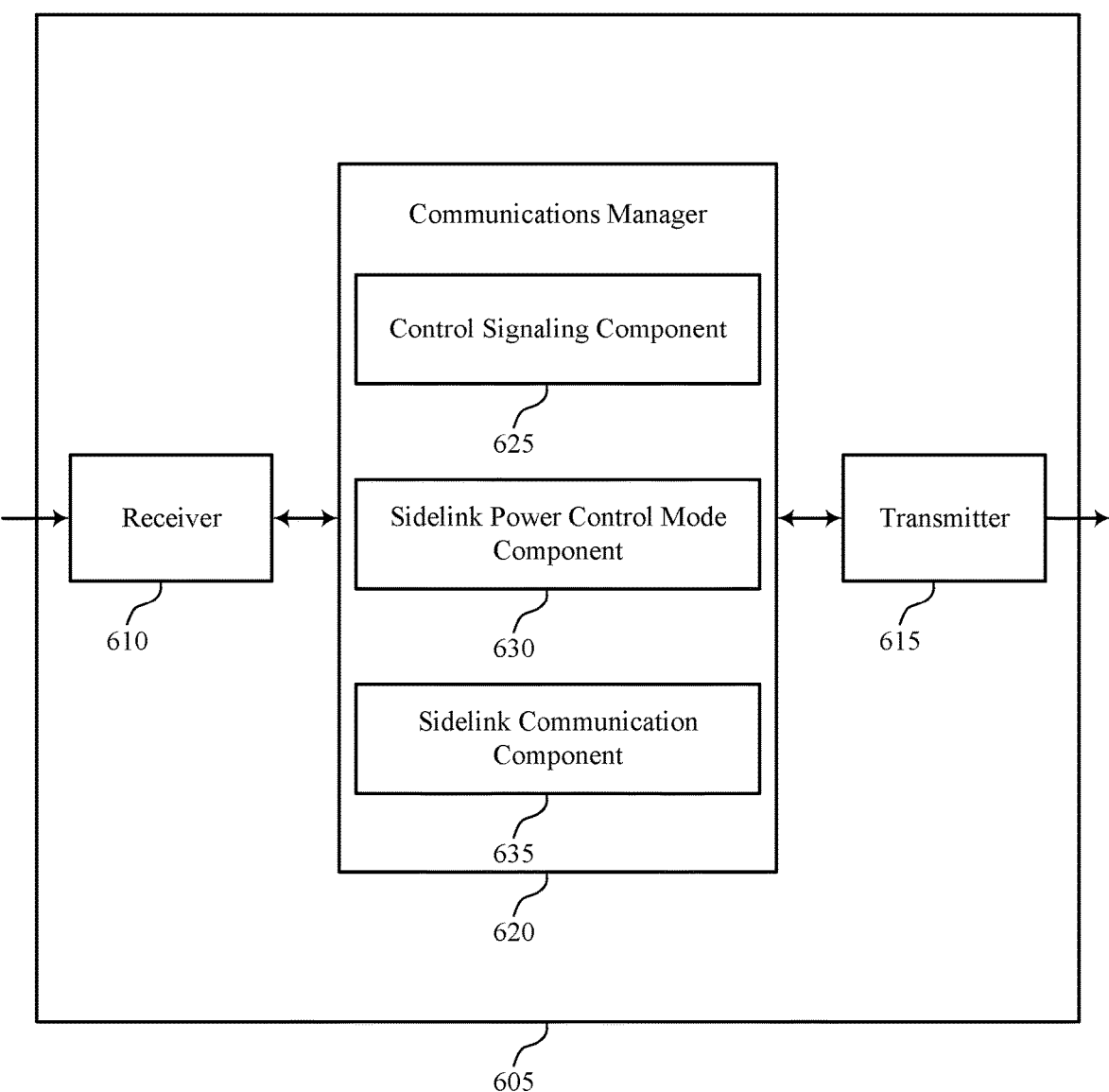

FIG. 6 shows a block diagram 600 of a device 605 that supports sidelink power control under network operation states in accordance with one or more examples as disclosed herein. The device 605 may be an example of aspects of a device 505 (e.g., a UE 115) as described herein. The device 605 may include a receiver 610, a transmitter 615, and a communications manager 620. The device 605 may also include at least one processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink power control under network operation states). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink power control under network operation states). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of sidelink power control under network operation states as described herein. For example, the communications manager 620 may include a control signaling component 625, a sidelink power control mode component 630, a sidelink communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The control signaling component 625 is capable of, configured to, or operable to support a means for receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both. The sidelink power control mode component 630 is capable of, configured to, or operable to support a means for switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state. The sidelink communication component 635 is capable of, configured to, or operable to support a means for communicating one or more sidelink messages with the second wireless device, the programmable logic controller, or both over a sidelink channel in accordance with the second sidelink power control mode.

Figure 7:
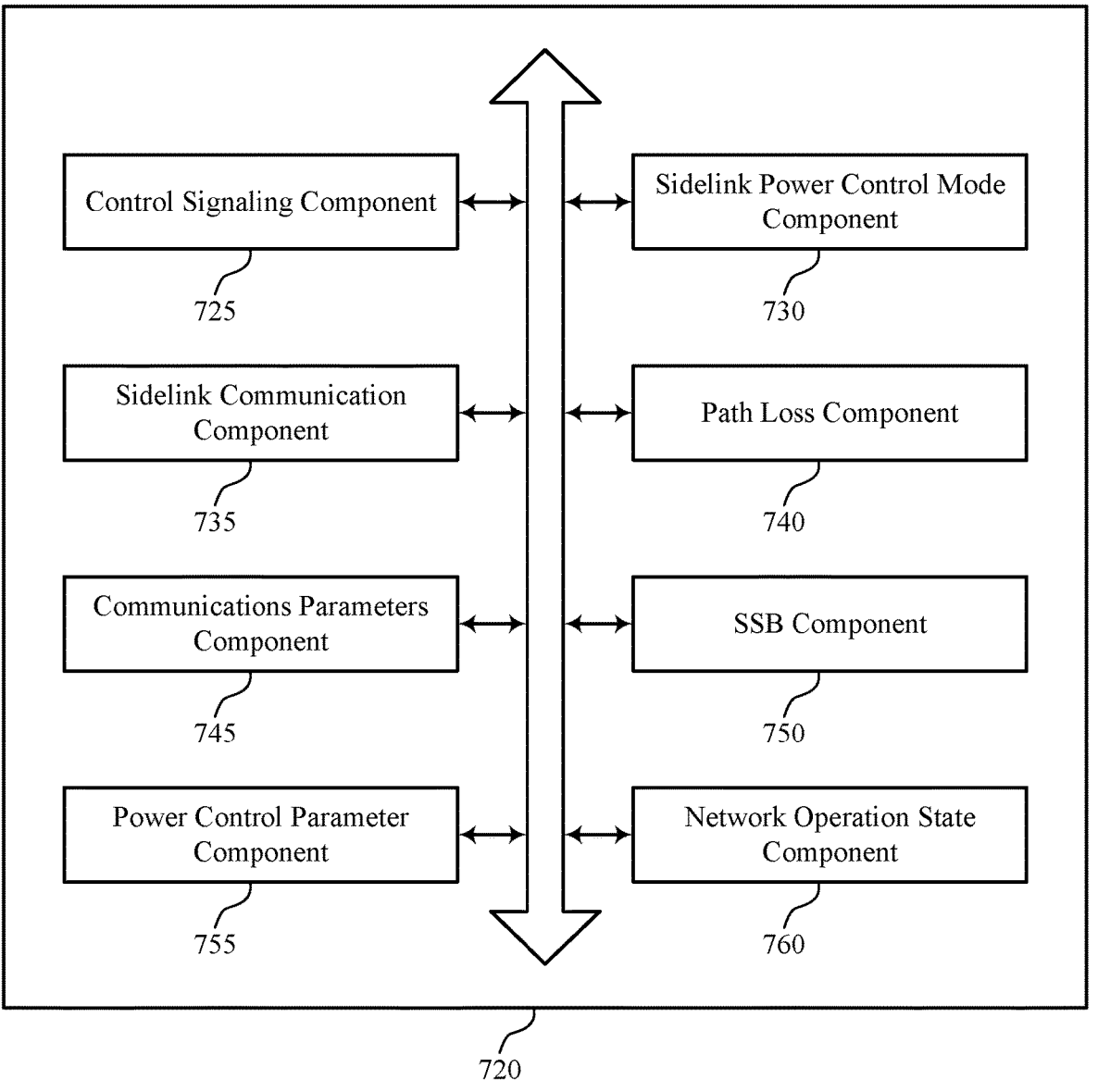
FIG. 7 shows a block diagram of a communications manager that supports sidelink power control under network operation states in accordance with one or more examples as disclosed herein.

FIG. 7 shows a block diagram 700 of a communications manager 720 that supports sidelink power control under network operation states in accordance with one or more examples as disclosed herein. The communications manager 720 may be an example of aspects of a communications manager 520, a communications manager 620, or both, as described herein. The communications manager 720, or various components thereof, may be an example of means for performing various aspects of sidelink power control under network operation states as described herein. For example, the communications manager 720 may include a control signaling component 725, a sidelink power control mode component 730, a sidelink communication component 735, a path loss component 740, a communication parameters component 745, an SSB component 750, a power control parameter component 755, a network operation state component 760, or any combination thereof. Each of these components may communicate, directly or indirectly, with one another (e.g., via one or more buses).

Additionally, or alternatively, the communications manager 720 may support wireless communications at a UE in accordance with examples as disclosed herein. The control signaling component 725 is capable of, configured to, or operable to support a means for receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both. The sidelink power control mode component 730 is capable of, configured to, or operable to support a means for switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state. The sidelink communication component 735 is capable of, configured to, or operable to support a means for communicating one or more sidelink messages with the second wireless device, the programmable logic controller, or both over a sidelink channel in accordance with the second sidelink power control mode.

In some examples, the sidelink power control mode component 730 is capable of, configured to, or operable to support a means for receiving the first control signaling indicating a pattern of the plurality of multiple network operation states, where switching from the first sidelink power control mode to the second sidelink power control mode is based on the pattern of the plurality of multiple network operation states indicating that the first network entity is operating in the second network operation state.

In some examples, receiving the first control signaling further includes receiving the first control signaling indicating to monitor path loss associated with a second network entity that differs from the first network entity, the second wireless device, or both. In some examples, communicating the one or more sidelink messages further includes communicating the one or more sidelink messages with the second wireless device based on one or more communication parameters for the second sidelink power control mode that correspond to a reference path loss value, the reference path loss value being based on the path loss associated with the second network entity, the second wireless device, the programmable logic controller, or any combination thereof.

In some examples, the path loss component 740 is capable of, configured to, or operable to support a means for receiving a control message that indicates to monitor path loss over an access link between the first network entity and the UE for use as a reference path loss in sidelink power control. In some examples, the communication parameters component 745 is capable of, configured to, or operable to support a means for where communicating the one or more sidelink messages further includes communicating the one or more sidelink messages with the second wireless device based on one or more communication parameters for the second sidelink power control mode that correspond to a value of the reference path loss.

In some examples, the sidelink power control mode component 730 is capable of, configured to, or operable to support a means for determining the change in the network operation state by the first network entity from the first network operation state to the second network operation state based at least in part on receiving a signal from the first network entity that indicates the change in the network operation state or a first time interval of a pattern of the plurality of network operation states ending and a second time interval of the pattern beginning.

In some examples, the sidelink power control mode component 730 is capable of, configured to, or operable to support a means for communicating one or more second sidelink messages with a programmable logic controller associated with the first network entity in one of the plurality of sidelink power control modes that is based on an active network operation state of the programmable logic controller and which of the first network operation state of the first network entity or the second network operation state of the first network entity is active.

In some examples, the SSB component 750 is capable of, configured to, or operable to support a means for receiving a set of multiple synchronization signal blocks in accordance with a periodicity that is based on an active network operation state of a programmable logic controller, the first network operation state of the first network entity, the second network operation state of the first network entity, or any combination thereof.

In some examples, the SSB component 750 is capable of, configured to, or operable to support a means for receiving one or more synchronization signal blocks including a broadcast channel that indicates an active network operation state of a programmable logic controller associated with the first network entity, the first network operation state of the first network entity, the second network operation state of the first network entity, or any combination thereof.

In some examples, the second sidelink power control mode is associated with one or more second values of open-loop power control parameters, closed-loop power control parameters, or both, that are different that one or more first values of open-loop power control parameters, closed-loop power control parameters, or both that are associated with the first sidelink power control mode.

In some examples, the control signaling component 725 is capable of, configured to, or operable to support a means for receiving control signaling indicating one or more closed-loop power control parameters, one or more open-loop power control parameters, or both that are associated with one or more of the plurality of sidelink power control modes. In some examples, the power control parameter component 755 is capable of, configured to, or operable to support a means for operating in the first sidelink power control mode or in the second sidelink power control mode using the one or more closed-loop power control parameters, the one or more open-loop power control parameters, or both.

In some examples, the plurality of multiple network operation states are associated with an antenna configuration, a transmit power configuration, withholding transmission of a synchronization signal block, withholding transmission of a system information block, or any combination thereof.

In some examples, the first control signaling is radio resource control signaling.

Figure 8:
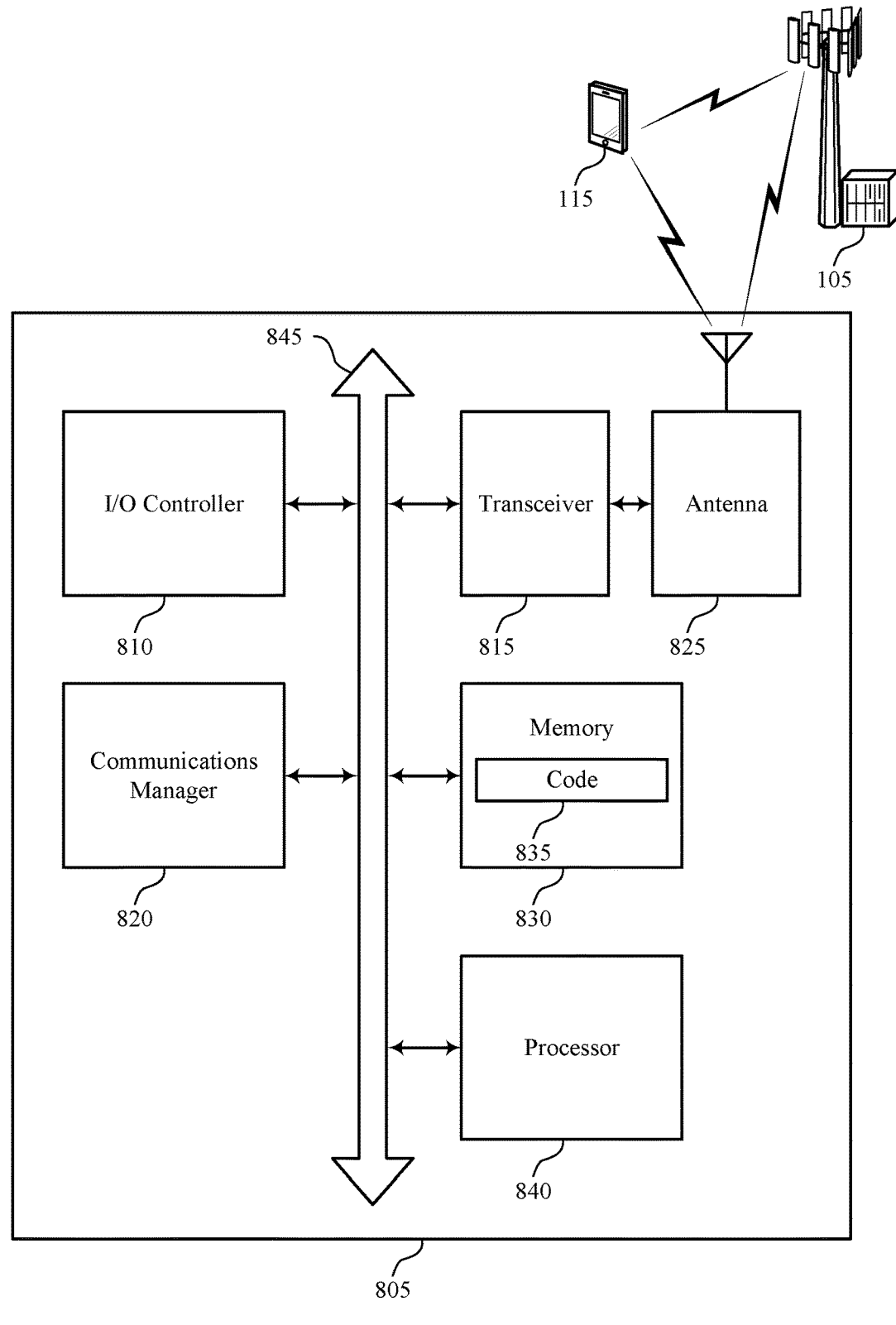
FIG. 8 shows a diagram of a wireless communications system including a device that supports sidelink power control under network operation states in accordance with one or more examples as disclosed herein.

FIG. 8 shows a diagram of a wireless communications system 800 including a device 805 that supports sidelink power control under network operation states in accordance with one or more examples as disclosed herein. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computerreadable instructions stored in at least one memory (e.g., the at least one memory 830) to cause the device 805 to perform various functions (e.g., functions or tasks supporting sidelink power control under network operation states). For example, the device 805 or a component of the device 805 may include at least one processor 840 and at least one memory 830 coupled with or to the at least one processor 840, the at least one processor 840 and the at least one memory 830 configured to perform various functions described herein.

Additionally, or alternatively, the communications manager 820 may support wireless communications at a UE in accordance with examples as disclosed herein. For example, the communications manager 820 is capable of, configured to, or operable to support a means for receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both. The communications manager 820 is capable of, configured to, or operable to support a means for switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state. The communications manager 820 is capable of, configured to, or operable to support a means for communicating one or more sidelink messages with the second wireless device, the programmable logic controller, or both over a sidelink channel in accordance with the second sidelink power control mode.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of sidelink power control under network operation states as described herein, or the at least one processor 840 and the at least one memory 830 may be otherwise configured to perform or support such operations.

FIG. 9 shows a flowchart illustrating a method 900 for sidelink power control under network operation states in accordance with examples as disclosed herein. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 905, the method may include receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity in one of the plurality of sidelink power control modes that corresponds to an active network operation state of the plurality of network operation states for the first network entity, or both. The operations of 905 may be performed in accordance with examples as disclosed herein. In some examples, aspects of the operations of 905 may be performed by a control signaling component 725 as described with reference to FIG. 7.

At 910, the method may include switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state. The operations of 910 may be performed in accordance with examples as disclosed herein. In some examples, aspects of the operations of 910 may be performed by a sidelink power control mode component 730 as described with reference to FIG. 7.

At 915, the method may include communicating one or more sidelink messages with the second wireless device, the programmable logic controller, or both over a sidelink channel in accordance with the second sidelink power control mode. The operations of 915 may be performed in accordance with examples as disclosed herein. In some examples, aspects of the operations of 915 may be performed by a sidelink communication component 735 as described with reference to FIG. 7.

Some examples of the method, apparatuses, and non-transitory computer-readable medium described herein may further include operations, features, means, or instructions for receiving the first control signaling further indicating a pattern of the plurality of multiple network operation states, where switching from the first sidelink power control mode to the second sidelink power control mode may be based on the pattern of the plurality of multiple network operation states indicating that the first network entity may be operating in the second network operation state.

Some examples of the method, apparatuses, and non-transitory computer-readable medium described herein may further include operations, features, means, or instructions for receiving the first control signaling further includes receiving the first control signaling indicating to monitor path loss associated with a second network entity that differs from the first network entity, the second wireless device, the programmable logic controller, or any combination thereof and communicating the one or more sidelink messages further includes communicating the one or more sidelink messages with the second wireless device based on one or more communications parameters for the second sidelink power control mode that correspond to a reference path loss value, the reference path loss value being based on the path loss associated with the second network entity, the second wireless device, the programmable logic controller, or any combination thereof.

Some examples of the method, apparatuses, and non-transitory computer-readable medium described herein may further include operations, features, means, or instructions for receiving a control message that indicates to monitor path loss over an access link between the first network entity and the UE for use as a reference path loss in sidelink power control and where communicating the one or more sidelink messages further includes communicating the one or more sidelink messages with the second wireless device based on one or more communications parameters for the second sidelink power control mode that correspond to a value of the reference path loss.

Some examples of the method, apparatuses, and non-transitory computer-readable medium described herein may further include operations, features, means, or instructions for determining the change in the network operation state by the first network entity from the first network operation state to the second network operation state based on receiving a signal from the first network entity that indicates the change in the network operation state or a first time interval of a pattern of the plurality of network operation states ending and a second time interval of the pattern beginning.

Some examples of the method, apparatuses, and non-transitory computer-readable medium described herein may further include operations, features, means, or instructions for communicating one or more second sidelink messages with a programmable logic controller associated with the first network entity in one of the plurality of sidelink power control modes that may be based on an active network operation state of the programmable logic controller and which of the first network operation state of the first network entity or the second network operation state of the first network entity is active.

Some examples of the method, apparatuses, and non-transitory computer-readable medium described herein may further include operations, features, means, or instructions for receiving a set of multiple synchronization signal blocks in accordance with a periodicity that may be based on an active network operation state of a programmable logic controller (e.g., a programmable logic controller associated with a network entity, such as the first network entity), the first network operation state of the first network entity, the second network operation state of the first network entity, or any combination thereof.

Some examples of the method, apparatuses, and non-transitory computer-readable medium described herein may further include operations, features, means, or instructions for receiving one or more synchronization signal blocks including a broadcast channel that indicates an active network operation state of a programmable logic controller associated with the first network entity, the first network operation state of the first network entity, the second network operation state of the first network entity, or any combination thereof.

In some examples of the method, apparatuses, and non-transitory computer-readable medium described herein, the second sidelink power control mode may be associated with one or more second values of open-loop power control parameters, closed-loop power control parameters, or both, that may be different that one or more first values of open-loop power control parameters, closed-loop power control parameters, or both that may be associated with the first sidelink power control mode.

Some examples of the method, apparatuses, and non-transitory computer-readable medium described herein may further include operations, features, means, or instructions for receiving control signaling indicating one or more closed-loop power control parameters, one or more open-loop power control parameters, or both, that may be associated with one or more of the plurality of sidelink power control modes and operating in the first sidelink power control mode or in the second sidelink power control mode using the one or more closed-loop power control parameters, the one or more open-loop power control parameters, or both.

In some examples of the method, apparatuses, and non-transitory computer-readable medium described herein, the plurality of multiple network operation states may be associated with an antenna configuration, a transmit power configuration, withholding transmission of a synchronization signal block, withholding transmission of a system information block, or any combination thereof.

FIG. 10 shows a flowchart illustrating a method 1000 for sidelink power control under network operation states in accordance with examples as disclosed herein. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1005, the method may include receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both, where the first control signaling indicates a pattern of the plurality of multiple network operation states, where switching from the first sidelink power control mode to the second sidelink power control mode is based on the pattern of the plurality of multiple network operation states indicating that the first network entity is operating in the second network operation state. The operations of 1005 may be performed in accordance with examples as disclosed herein. In some examples, aspects of the operations of 1005 may be performed by a control signaling component 725, a sidelink power control mode component 730, or both, as described with reference to FIG. 7.

At 1010, the method may include switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state. In some examples, switching from the first sidelink power control mode to the second sidelink power control mode is based on the pattern of the plurality of multiple network operation states indicating that the first network entity is operating in the second network operation state. The operations of 1015 may be performed in accordance with examples as disclosed herein. In some examples, aspects of the operations of 1015 may be performed by a sidelink power control mode component 730 as described with reference to FIG. 7.

At 1015, the method may include communicating one or more sidelink messages with the second wireless device, the programmable logic controller, or both over a sidelink channel in accordance with the second sidelink power control mode. The operations of 1020 may be performed in accordance with examples as disclosed herein. In some examples, aspects of the operations of 1020 may be performed by a sidelink communication component 735 as described with reference to FIG. 7.

FIG. 11 shows a flowchart illustrating a method 1100 for sidelink power control under network operation states in accordance with examples as disclosed herein. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1105, the method may include receiving, over an access link, first control signaling indicating a correspondence between a plurality of multiple network operation states of a first network entity of a network and a plurality of sidelink power control modes of the UE for sidelink communications between the UE and a second wireless device, a programmable logic controller associated with the first network entity, or both, where receiving the first control signaling further includes receiving the first control signaling indicating to monitor path loss associated with a second network entity that differs from the first network entity, the second wireless device, or both. The operations of 1105 may be performed in accordance with examples as disclosed herein. In some examples, aspects of the operations of 1105 may be performed by a control signaling component 725, a path loss component 740, or both, as described with reference to FIG. 7.

At 1110, the method may include switching from a first sidelink power control mode of the plurality of sidelink power control modes to a second sidelink power control mode of the plurality of sidelink power control modes based on a change in a network operation state by the first network entity from a first network operation state of the plurality of multiple network operation states to a second network operation state of the plurality of multiple network operation states, where the second sidelink power control mode corresponds to the second network operation state. The operations of 1110 may be performed in accordance with examples as disclosed herein. In some examples, aspects of the operations of 1110 may be performed by a sidelink power control mode component 730 as described with reference to FIG. 7.

At 1115, the method may include communicating one or more sidelink messages with the second wireless device, the programmable logic controller, or both over a sidelink channel in accordance with the second sidelink power control mode. In some examples, communicating the one or more sidelink messages further includes communicating the one or more sidelink messages with the second wireless device, the programmable logic controller, or both based on one or more communications parameters for the second sidelink power control mode that correspond to a reference path loss value, the reference path loss value being based on the path loss associated with the second network entity, the second wireless device, the programmable logic controller, or any combination thereof. The operations of 1115 may be performed in accordance with examples as disclosed herein. In some examples, aspects of the operations of 1115 may be performed by a sidelink communication component 735 as described with reference to FIG. 7. In some examples, aspects of the operations of 1115 may be performed by a communication parameters component 745 as described with reference to FIG. 7.

The following provides an overview of aspects of the present disclosure:

Aspect 1: A method for wireless communications at a UE, comprising: receiving, over an access link, first control signaling indicating a correspondence between a plurality of network operation states of a first network entity of a network and a plurality of sidelink power control modes of the UE for sidelink communications between the UE and a second wireless device, a programmable logic controller associated with the first network entity, or both; switching from a first sidelink power control mode of the plurality of sidelink power control modes to a second sidelink power control mode of the plurality of sidelink power control modes based at least in part on a change in a network operation state by the first network entity from a first network operation state of the plurality of network operation states to a second network operation state of the plurality of network operation states, wherein the second sidelink power control mode corresponds to the second network operation state; and communicating one or more sidelink messages with the second wireless device, the programmable logic controller, or both over a sidelink channel in accordance with the second sidelink power control mode.

Aspect 2: The method of aspect 1, further comprising: receiving the first control signaling indicating a pattern of the plurality of network operation states, wherein switching from the first sidelink power control mode to the second sidelink power control mode is based at least in part on the pattern of the plurality of network operation states indicating that the first network entity is operating in the second network operation state.

Aspect 3: The method of any of aspects 1 through 2, wherein receiving the first control signaling further comprises receiving the first control signaling indicating to monitor path loss associated with a second network entity that differs from the first network entity, the second wireless device, the programmable logic controller, or any combination thereof; and communicating the one or more sidelink messages further comprises communicating the one or more sidelink messages with the second wireless device based at least in part on one or more communications parameters for the second sidelink power control mode that correspond to a reference path loss value, the reference path loss value being based on the path loss associated with the second network entity, the second wireless device, the programmable logic controller, or any combination thereof.

Aspect 4: The method of any of aspects 1 through 3, further comprising: receiving a control message that indicates to monitor path loss over an access link between the first network entity and the UE for use as a reference path loss in sidelink power control; wherein communicating the one or more sidelink messages further comprises communicating the one or more sidelink messages with the second wireless device based at least in part on one or more communications parameters for the second sidelink power control mode that correspond to a value of the reference path loss.

Aspect 5: The method of any of aspects 1 through 4, further comprising: determining the change in the network operation state by the first network entity from the first network operation state to the second network operation state based at least in part on receiving a signal from the first network entity that indicates the change in the network operation state or a first time interval of a pattern of the plurality of network operation states ending and a second time interval of the pattern beginning.

Aspect 6: The method of aspect 5, further comprising: communicating one or more second sidelink messages with a programmable logic controller associated with the first network entity in one of the plurality of sidelink power control modes that is based at least in part on an active network operation state of the programmable logic controller and which of the first network operation state of the first network entity or the second network operation state of the first network entity is active.

Aspect 7: The method of any of aspects 1 through 6, further comprising: receiving a plurality of synchronization signal blocks in accordance with a periodicity that is based at least in part on an active network operation state of a programmable logic controller, the first network operation state of the first network entity, the second network operation state of the first network entity, or any combination thereof.

Aspect 8: The method of any of aspects 1 through 7, further comprising: receiving one or more synchronization signal blocks comprising a broadcast channel that indicates an active network operation state of a programmable logic controller associated with the first network entity, the first network operation state of the first network entity, the second network operation state of the first network entity, or any combination thereof.

Aspect 9: The method of any of aspects 1 through 8, wherein the second sidelink power control mode is associated with one or more second values of open-loop power control parameters, closed-loop power control parameters, or both, that are different that one or more first values of open-loop power control parameters, closed-loop power control parameters, or both that are associated with the first sidelink power control mode.

Aspect 10: The method of any of aspects 1 through 9, further comprising: receiving control signaling indicating one or more closed-loop power control parameters, one or more open-loop power control parameters, or both that are associated with one or more of the plurality of sidelink power control modes; and operating in the first sidelink power control mode or in the second sidelink power control mode using the one or more closed-loop power control parameters, the one or more open-loop power control parameters, or both.

Aspect 11: The method of any of aspects 1 through 10, wherein the plurality of network operation states are associated with an antenna configuration, a transmit power configuration, withholding transmission of a synchronization signal block, withholding transmission of a system information block, or any combination thereof.

Aspect 12: The method of any of aspects 1 through 11, wherein the first control signaling is radio resource control signaling.

Aspect 13: An apparatus for wireless communications at a UE, comprising at least one processor; at least one memory coupled with the at least one processor; the at least one memory storing instructions executable by the at least one processor to cause the UE apparatus to perform a method of any of aspects 1 through 12.

Aspect 14: An apparatus for wireless communications at a UE, comprising at least one means for performing a method of any of aspects 1 through 12.

Aspect 15: A non-transitory computer-readable medium storing code for wireless communications at a UE, the code comprising instructions executable by at least one processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the at least one processor may be any processor, controller, microcontroller, or state machine. A processor may also be implemented as a combination of computing devices (e.g., a combination of a DSP and a microprocessor, multiple micro-processors, one or more microprocessors in conjunction with a DSP core, or any other such configuration).

The functions described herein may be implemented using hardware, software executed by at least one processor, firmware, or any combination thereof. If implemented using software executed by at least one processor, the functions may be stored as or transmitted using one or more instructions or code of a computer-readable medium. Other examples and implementations are within the scope of the disclosure and appended claims. For example, due to the nature of software, functions described herein may be implemented using software executed by at least one processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
 at least one processor; and
 at least one memory coupled with the at least one processor, the at least one memory storing instructions executable by the at least one processor to cause the UE to:

receive, over an access link, first control signaling indicating a correspondence between a plurality of network operation states of a first network entity of a network and a plurality of sidelink power control modes of the UE for sidelink communications between the UE and a second wireless device, a programmable logic controller associated with the first network entity, or both;

determine a change in a network operation state by the first network entity from a first network operation state to a second network operation state based at least in part on a first time interval of a pattern of the plurality of network operation states ending and a second time interval of the pattern beginning;

switch from a first sidelink power control mode of the plurality of sidelink power control modes to a second sidelink power control mode of the plurality of sidelink power control modes based at least in part on the change in the network operation state by the first network entity from the first network operation state of the plurality of network operation states to the second network operation state of the plurality of network operation states, wherein the second sidelink power control mode corresponds to the second network operation state; and communicate one or more sidelink messages with the second wireless device, the programmable logic controller, or both, over a sidelink channel in accordance with the second sidelink power control mode.

2. The UE of claim 1, wherein the instructions to receive the first control signaling are further executable by the at least one processor to cause the UE to:

receive the first control signaling that indicates a pattern of the plurality of network operation states, wherein the instructions to switch from the first sidelink power control mode to the second sidelink power control mode are executable by the at least one processor to cause the UE to:

switch from the first sidelink power control mode to the second sidelink power control mode based at least in part on the pattern of the plurality of network operation states indicating that the first network entity is operating in the second network operation state.

3. The UE of claim 1, wherein the instructions to receive the first control signaling are executable by the at least one processor to cause the UE to:

receive the first control signaling that indicates to monitor path loss associated with a second network entity that differs from the first network entity, the second wireless device, the programmable logic controller, or any combination thereof, wherein the instructions to communicate the one or more sidelink messages are executable by the at least one processor to cause the UE to:

communicate the one or more sidelink messages with the second wireless device based at least in part on one or more communication parameters for the second sidelink power control mode that correspond to a reference path loss value, the reference path loss value being based on the path loss associated with the second network entity, the second wireless device, the programmable logic controller, or any combination thereof.

4. The UE of claim 1, wherein the instructions are further executable by the at least one processor to cause the UE to:

receive a control message that indicates to monitor path loss over an access link between the first network entity and the UE for use as a reference path loss in sidelink power control, wherein the instructions to communicate the one or more sidelink messages are executable by the at least one processor to cause the UE to:

communicate the one or more sidelink messages with the second wireless device based at least in part on one or more communication parameters for the second sidelink power control mode that correspond to a value of the reference path loss.

5. The UE of claim 1, wherein the instructions are further executable by the at least one processor to cause the UE to:

determine the change in the network operation state by the first network entity from the first network operation state to the second network operation state based at least in part on reception of a signal from the first network entity that indicates the change in the network operation state.

6. The UE of claim 1, wherein the instructions are further executable by the at least one processor to cause the UE to:

communicate one or more second sidelink messages with the programmable logic controller associated with the first network entity in one of the plurality of sidelink power control modes that is based at least in part on an active network operation state of the programmable logic controller and which of the first network operation state of the first network entity or the second network operation state of the first network entity is active.

7. The UE of claim 1, wherein the instructions are further executable by the at least one processor to cause the UE to:

receive a plurality of synchronization signal blocks in accordance with a periodicity that is based at least in part on an active network operation state of a programmable logic controller, the first network operation state of the first network entity, the second network operation state of the first network entity, or any combination thereof.

8. The UE of claim 1, wherein the instructions are further executable by the at least one processor to cause the UE to:

receive one or more synchronization signal blocks comprising a broadcast channel that indicates an active network operation state of a programmable logic controller associated with the first network entity, the first network operation state of the first network entity, the second network operation state of the first network entity, or any combination thereof.

9. The UE of claim 1, wherein the second sidelink power control mode is associated with one or more second values of open-loop power control parameters, closed-loop power control parameters, or both, that are different that one or more first values of open-loop power control parameters, closed-loop power control parameters, or both that are associated with the first sidelink power control mode.

10. The UE of claim 1, wherein the instructions are further executable by the at least one processor to cause the UE to:

receive control signaling indicating one or more closed-loop power control parameters, one or more open-loop power control parameters, or both that are associated with one or more of the plurality of sidelink power control modes; and operate in the first sidelink power control mode or in the second sidelink power control mode using the one or more closed-loop power control parameters, the one or more open-loop power control parameters, or both.

11. The UE of claim 1, wherein the plurality of network operation states are associated with an antenna configuration, a transmit power configuration, withholding transmission of a synchronization signal block, withholding transmission of a system information block, or any combination thereof.

12. The UE of claim 1, wherein:
the first control signaling is radio resource control signaling.

13. A method for wireless communications at a user equipment (UE), comprising:
receiving, over an access link, first control signaling indicating a correspondence between a plurality of network operation states of a first network entity of a network and a plurality of sidelink power control modes of the UE for sidelink communications between the UE and a second wireless device, a programmable logic controller associated with the first network entity, or both;
determining a change in a network operation state by the first network entity from a first network operation state to a second network operation state based at least in part on a first time interval of a pattern of the plurality of network operation states ending and a second time interval of the pattern beginning;
switching from a first sidelink power control mode of the plurality of sidelink power control modes to a second sidelink power control mode of the plurality of sidelink power control modes based at least in part on the change in the network operation state by the first network entity from the first network operation state of the plurality of network operation states to the second network operation state of the plurality of network operation states, wherein the second sidelink power control mode corresponds to the second network operation state; and
communicating one or more sidelink messages with the second wireless device, the programmable logic controller, or both over a sidelink channel in accordance with the second sidelink power control mode.

14. The method of claim 13, wherein receiving the first control signaling further comprises:
receiving the first control signaling that indicates a pattern of the plurality of network operation states, wherein switching from the first sidelink power control mode to the second sidelink power control mode is based at least in part on the pattern of the plurality of network operation states indicating that the first network entity is operating in the second network operation state.

15. The method of claim 13, wherein:
the first control signaling indicates to monitor path loss associated with a second network entity that differs from the first network entity, the second wireless device, the programmable logic controller, or any combination thereof; and
the one or more sidelink messages are communicated with the second wireless device based at least in part on one or more communication parameters for the second sidelink power control mode that correspond to a reference path loss value, the reference path loss value being based on the path loss associated with the second network entity, the second wireless device, the programmable logic controller, or any combination thereof.

16. The method of claim 13, further comprising:
receiving a control message that indicates to monitor path loss over an access link between the first network entity and the UE for use as a reference path loss in sidelink power control;

wherein communicating the one or more sidelink messages further comprises communicating the one or more sidelink messages with the second wireless device based at least in part on one or more communication parameters for the second sidelink power control mode that correspond to a value of the reference path loss.

17. The method of claim 13, further comprising:
determining the change in the network operation state by the first network entity from the first network operation state of the plurality of network operation states to the second network operation state of the plurality of network operation states based at least in part on reception of a signal from the first network entity that indicates the change in the network operation state.

18. The method of claim 13, further comprising:
communicating one or more second sidelink messages with a programmable logic controller associated with the first network entity in one of the plurality of sidelink power control modes that is based at least in part on an active network operation state of the programmable logic controller and which of the first network operation state of the first network entity or the second network operation state of the first network entity is active.

19. The method of claim 13, further comprising:
receiving a plurality of synchronization signal blocks in accordance with a periodicity that is based at least in part on an active network operation state of a programmable logic controller, the first network operation state of the first network entity, the second network operation state of the first network entity, or any combination thereof.

20. The method of claim 13, further comprising:
receiving one or more synchronization signal blocks comprising a broadcast channel that indicates an active network operation state of a programmable logic controller associated with the first network entity, the first network operation state of the first network entity, the second network operation state of the first network entity, or any combination thereof.

21. The method of claim 13, wherein the second sidelink power control mode is associated with one or more second values of open-loop power control parameters, closed-loop power control parameters, or both, that are different that one or more first values of open-loop power control parameters, closed-loop power control parameters, or both that are associated with the first sidelink power control mode.

22. The method of claim 13, further comprising:
receiving control signaling indicating one or more closed-loop power control parameters, one or more open-loop power control parameters, or both that are associated with one or more of the plurality of sidelink power control modes; and
operating in the first sidelink power control mode or in the second sidelink power control mode using the one or more closed-loop power control parameters, the one or more open-loop power control parameters, or both.

23. The method of claim 13, wherein the plurality of network operation states are associated with an antenna configuration, a transmit power configuration, withholding transmission of a synchronization signal block, withholding transmission of a system information block, or any combination thereof.

24. The method of claim 13, wherein the first control signaling is radio resource control signaling.

25. An apparatus for wireless communications at a user equipment (UE), comprising:

means for receiving, over an access link, first control signaling indicating a correspondence between a plurality of network operation states of a first network entity of a network and a plurality of sidelink power control modes of the UE for sidelink communications between the UE and a second wireless device, a programmable logic controller associated with the first network entity, or both;

means for determining a change in a network operation state by the first network entity from a first network operation state to a second network operation state based at least in part on a first time interval of a pattern of the plurality of network operation states ending and a second time interval of the pattern beginning;

means for switching from a first sidelink power control mode of the plurality of sidelink power control modes to a second sidelink power control mode of the plurality of sidelink power control modes based at least in part on the change in the network operation state by the first network entity from the first network operation state of the plurality of network operation states to the second network operation state of the plurality of network operation states, wherein the second sidelink power control mode corresponds to the second network operation state; and means for communicating one or more sidelink messages with the second wireless device, the programmable logic controller, or both over a sidelink channel in accordance with the second sidelink power control mode.

26. The apparatus of claim 25, wherein:

the first control signaling indicates a pattern of the plurality of network operation states, and wherein switching from the first sidelink power control mode to the second sidelink power control mode is based at least in part on the pattern of the plurality of network operation states indicating that the first network entity is operating in the second network operation state.

27. The apparatus of claim 25, wherein:

the first control signaling indicates to monitor path loss associated with a second network entity that differs from the first network entity, the second wireless device, the programmable logic controller, or any combination thereof; and the one or more sidelink messages are communicated with the second wireless device based at least in part on one or more communication parameters for the second sidelink power control mode that correspond to a reference path loss value, the reference path loss value being based on the path loss associated with the second network entity, the second wireless device, the programmable logic controller, or any combination thereof.

28. A non-transitory computer-readable medium storing code for wireless communications at a user equipment (UE), the code comprising instructions executable by at least one processor to:

receive, over an access link, first control signaling indicating a correspondence between a plurality of network operation states of a first network entity of a network and a plurality of sidelink power control modes of the UE for sidelink communications between the UE and a second wireless device, a programmable logic controller associated with the first network entity, or both;

determine a change in a network operation state by the first network entity from a first network operation state to a second network operation state based at least in part on a first time interval of a pattern of the plurality of network operation states ending and a second time interval of the pattern beginning;

switch from a first sidelink power control mode of the plurality of sidelink power control modes to a second sidelink power control mode of the plurality of sidelink power control modes based at least in part on the change in the network operation state by the first network entity from the first network operation state of the plurality of network operation states to the second network operation state of the plurality of network operation states, wherein the second sidelink power control mode corresponds to the second network operation state; and communicate one or more sidelink messages with the second wireless device, the programmable logic controller, or both over a sidelink channel in accordance with the second sidelink power control mode.

29. The non-transitory computer-readable medium of claim 28, wherein the instructions to receive the first control signaling are further executable by the at least one processor to:

receive the first control signaling that indicates a pattern of the plurality of network operation states, wherein switching from the first sidelink power control mode to the second sidelink power control mode is based at least in part on the pattern of the plurality of network operation states indicating that the first network entity is operating in the second network operation state.

30. The non-transitory computer-readable medium of claim 28, wherein the instructions to receive the first control signaling are further executable by the at least one processor to:

receive the first control signaling that indicates to monitor path loss associated with a second network entity that differs from the first network entity, the second wireless device, the programmable logic controller, or any combination thereof; and wherein the instructions to communicate the one or more sidelink messages are executable by the at least one processor to:

communicate the one or more sidelink messages with the second wireless device based at least in part on one or more communication parameters for the second sidelink power control mode that correspond to a reference path loss value, the reference path loss value being based on the path loss associated with the second network entity, the second wireless device, the programmable logic controller, or any combination thereof.

* * * * *